United States Patent
Doi et al.

(10) Patent No.: US 12,097,611 B2
(45) Date of Patent: Sep. 24, 2024

(54) SENSOR ASSEMBLY AND SUCTION APPARATUS

(71) Applicant: OMRON Corporation, Kyoto (JP)

(72) Inventors: Sayaka Doi, Kyoto (JP); Hiroki Koga, Kyoto (JP)

(73) Assignee: OMRON Corporation, Kyoto (JP)

( * ) Notice: Subject to any disclaimer, the term of this patent is extended or adjusted under 35 U.S.C. 154(b) by 340 days.

(21) Appl. No.: 17/604,784

(22) PCT Filed: May 13, 2019

(86) PCT No.: PCT/JP2019/018987
§ 371 (c)(1),
(2) Date: Oct. 19, 2021

(87) PCT Pub. No.: WO2020/230247
PCT Pub. Date: Nov. 19, 2020

(65) Prior Publication Data
US 2022/0219334 A1 Jul. 14, 2022

(51) Int. Cl.
*B25J 13/08* (2006.01)
*B25J 15/06* (2006.01)
*B25J 19/02* (2006.01)
*G01B 21/32* (2006.01)

(52) U.S. Cl.
CPC ......... *B25J 13/086* (2013.01); *B25J 15/0616* (2013.01); *B25J 19/02* (2013.01); *G01B 21/32* (2013.01)

(58) Field of Classification Search
CPC ...... B25J 13/086; B25J 15/0616; B25J 19/02; G01B 11/165; G01B 21/32
See application file for complete search history.

(56) References Cited

U.S. PATENT DOCUMENTS

| | | | |
|---|---|---|---|
| 10,610,070 B2 | 4/2020 | Lv | |
| 10,933,537 B1 * | 3/2021 | Polido | B25J 13/081 |
| 2002/0011114 A1 * | 1/2002 | Miyashita | G01L 9/0042 |
| | | | 73/718 |
| 2007/0188897 A1 * | 8/2007 | Murakami | G02B 26/0825 |
| | | | 359/224.1 |

(Continued)

FOREIGN PATENT DOCUMENTS

| | | | | |
|---|---|---|---|---|
| CN | 104416576 A | | 3/2015 | |
| CN | 105460100 A | * | 4/2016 | ........... B62D 57/024 |

(Continued)

OTHER PUBLICATIONS

Machine Translation of JP_2008149435_A (Year: 2023).*

(Continued)

*Primary Examiner* — David L Singer
(74) *Attorney, Agent, or Firm* — METROLEX IP LAW GROUP, PLLC; Robert L. Scott, Esq

(57) ABSTRACT

A sensor assembly may include: a main body and one or more first proximity sensors. The main body may include a space through which a shaft of a suction apparatus passes is formed. The one or more first proximity sensors may be disposed in the main body, and may be configured to detect the suction portion that is deformed by the negative pressure. The main body may further include a fixture that has a fixed portion that is fixed to the shaft, and a support portion that supports the main body.

20 Claims, 16 Drawing Sheets

(56) References Cited

U.S. PATENT DOCUMENTS

| | | | |
|---|---|---|---|
| 2015/0066199 A1* | 3/2015 | Shimono | B25J 9/0093 |
| | | | 700/218 |
| 2015/0305581 A1 | 10/2015 | Lv | |
| 2017/0106534 A1* | 4/2017 | Nakamoto | B25J 19/068 |
| 2018/0116559 A1* | 5/2018 | Otaka | A61L 31/06 |
| 2019/0077027 A1 | 3/2019 | Tanaka et al. | |
| 2019/0283217 A1* | 9/2019 | Tanaka | B64U 70/00 |

FOREIGN PATENT DOCUMENTS

| | | | | |
|---|---|---|---|---|
| CN | 205734995 U | | 11/2016 | |
| DE | 102015218195 A1 * | | 3/2017 | B25J 13/081 |
| DE | 102016203144 A1 * | | 8/2017 | B25B 11/00 |
| EP | 3290167 A1 * | | 3/2018 | B25J 13/085 |
| FR | 3 005 887 A1 | | 11/2014 | |
| JP | H01-300822 A | | 12/1989 | |
| JP | H6-80370 A | | 3/1994 | |
| JP | H074097 B2 * | | 1/1995 | B25J 15/0616 |
| JP | H09-150386 A | | 6/1997 | |
| JP | H09-290385 A | | 11/1997 | |
| JP | 2006-177838 A | | 7/2006 | |
| JP | 2008-149435 A | | 7/2008 | |
| JP | 2010-188483 A | | 9/2010 | |
| JP | 2011-107011 A | | 6/2011 | |
| JP | 2011-156610 A | | 8/2011 | |
| JP | 2013-255971 A | | 12/2013 | |
| JP | 2015-518430 A | | 7/2015 | |
| KR | 20120108720 A * | | 10/2012 | B25J 9/0093 |
| KR | 20180040325 A | | 4/2018 | |
| KR | 102170329 B1 * | | 10/2020 | B65G 47/918 |

OTHER PUBLICATIONS

Machine Translation of JP_2006177838_A (Year: 2023).*
Machine Translation of JP_2011107011_A (Year: 2023).*
Machine Translation of JP_H01300822_A (Year: 2023).*
Machine Translation of JP_2015518430_A (Year: 2023).*
Machine Translation of FR_3005887_A1_M (Year: 2023).*
Machine Translation of JP_06080370_A_M (Year: 2023).*
Hasegawa et al, Detecting and Picking of Folded Objects with a Multiple Sensor Integrated Robot Hand, 2018 IEEE/RSJ International Conference on Intelligent Robots and Systems (IROS) Madrid, Spain, Oct. 1-5, 2018 (Year: 2018).*
Sareh et al, Anchoring like octopus: biologically inspired soft artificial sucker, The Royal Society Publishing, J. R. Soc. Interface 14: 20170395. (Year: 2017).*
You et al, Model-Free Grasp Planning for Configurable Vacuum Grippers, 2018 IEEE/RSJ International Conference on Intelligent Robots and Systems (IROS) Madrid, Spain, Oct. 1-5, 2018 (Year: 2018).*
Extended European search report (EESR) issued on Jun. 14, 2022 in a counterpart European patent application.
English translation of the International Search Report ("ISR") of PCT/JP2019/018987 mailed on Jul. 16, 2019.
Written Opinion("WO") of PCT/JP2019/018987 mailed on Jul. 16, 2019.
Office Action (CNOA) issued on Dec. 7, 2023 in a counterpart Chinese patent application, with English translation.

* cited by examiner

SENSOR ASSEMBLY AND SUCTION APPARATUS

TECHNICAL FIELD

The disclosure relates to a sensor assembly and a suction apparatus.

BACKGROUND ART

A work robot including a robot arm with a plurality of arm members is known in the related art. Patent document 1 discloses, for example, a robot hand (robot arm) used in a conveyance robot for holding and conveying an object to be conveyed, the robot hand including: a hand body; a plurality of bellows-type suction pads provided on the hand body, expandable and contractible in an axial direction with elastic force, and suctioning the object to be conveyed using vacuum pressure; and an axial length sensor for measuring an axial length of each bellows-type suction pad that is suctioning the object to be conveyed.

RELATED ART DOCUMENT

Patent Document

Patent Document 1: JP 2011-107011A

SUMMARY

In the above-described conventional technique, the axial length sensor of the robot hand detects the object to be conveyed, and does not detect the amount of deformation of the suction pad. Accordingly, it may not be possible to accurately determine whether or not the suction pad is in a state in which it is possible to suction the object to be conveyed.

One or more embodiments may provide a sensor that is attachable to a suction apparatus, and may measure the amount of deformation of a suction portion such as a suction pad.

In order to solve the above-described issues, one or more embodiments may adopt the following configuration.

A sensor assembly according to one or more embodiments is a sensor assembly that is attachable to a suction apparatus including a suction portion configured to suction an object with negative pressure, and a shaft configured to support the suction portion and having an air passage, the sensor assembly includes: a main body in which a space through which the shaft of the suction apparatus passes is formed; one or more first proximity sensors that are disposed on the main body, and configured to detect that the suction portion is deformed by the negative pressure; a fixture that has a fixed portion that is fixed to the shaft, and a support portion that is configured to support the main body.

According to the above configuration, the sensor assembly may be attached to the shaft of the suction apparatus that supports the suction portion and has the air passage, and the first proximity sensor may be disposed on the suction portion. In addition, the distance between the first proximity sensor and the suction portion may be easily changed, and the degree of freedom of the installation position of the first proximity sensor is high. Furthermore, it is possible to measure the amount of deformation of the suction portion using the first proximity sensor.

In the sensor assembly according to one or more embodiments, the support portion may extend from the fixed portion toward the suction portion.

With the above configuration, the first proximity sensor may be disposed on the upper portion of the suction portion to be closer to the suction portion, and the amount of deformation of the suction portion may be easily measured. In addition, the S/N ratio (signal-to-noise ratio) is improved due to bringing the first proximity sensor closer to the suction portion.

In the sensor assembly according to one or more embodiments, the main body may be supported by the support portion on a suction portion side relative to the fixed portion.

With the above configuration, when a pipe is provided on the shaft, the fixed portion may be attached above the pipe. Accordingly, the first proximity sensor may be brought closer to the suction portion, and the amount of the deformation of the suction portion may be easily measured. In addition, the S/N ratio (signal-to-noise ratio) is improved by bringing the first proximity sensor closer to the suction portion.

In the sensor assembly according to one or more embodiments, a plurality of the first proximity sensors may be disposed on the main body along a circumferential direction of the shaft.

With this configuration, it is possible to eliminate blind spots of the plurality of the first proximity sensors.

In the sensor assembly according to one or more embodiments, the one or more first proximity sensors may be disposed in a circular shape covering the suction portion.

In the above configuration, an appropriate proximity sensor may be selected in accordance with the size of the main body.

In the sensor assembly according to one or more embodiments, a plurality of the first proximity sensors may be disposed on the main body along a radial direction with respect to the shaft.

With the above configuration, it is possible to obtain the details of the deformation of the suction portion by observing the suction portion with higher resolution. As a result, the state of deformation of the suction portion may be accurately measured.

In the sensor assembly according to one or more embodiments, the sensor assembly may further include one or more third proximity sensors that are disposed on a radially outer side of the first proximity sensor with respect to the shaft in the main body, and that is configured to detect the object.

With the above configuration, in addition to the amount of displacement of the suction portion, the state of the object to be suctioned may also be measured. As a result, the detection accuracy may be improved, and the operation speed of the suction apparatus may be increased.

In the sensor assembly according to one or more embodiments, the sensor assembly may further include one or more second proximity sensors that are disposed on a side surface of the main body, and that are configured to detect an object approaching the side surface of the main body.

With the above configuration, the state of the side surface of the sensor assembly may be measured, and for example, it is possible to prevent collision between the sensor assembly and the object approaching the suction apparatus.

In the sensor assembly according to one or more embodiments, a plurality of the second proximity sensors may be disposed on the side surface of the main body along the circumferential direction of the shaft.

With the above configuration, the state of the side surface of the sensor assembly may be measured accurately, and for example, it is possible to prevent collision between the sensor assembly and objects approaching the suction apparatus from a plurality of directions.

A suction apparatus according to one or more embodiments may include: the sensor assembly; a suction portion configured to suction an object with negative pressure; and a shaft configured to support the suction portion and having an air passage.

According to the above configuration, the sensor assembly is attachable to the shaft that supports the suction portion and has the air passage, and the first proximity sensor may be disposed on the suction portion. In addition, the distance between the first proximity sensor and the suction portion may be easily changed, and the degree of freedom of the installation position of the first proximity sensor is high. Furthermore, it is possible to measure the amount of deformation of the suction portion using the first proximity sensor.

In the suction apparatus according to one or more embodiments, the suction portion may include a conductive member at a portion to be displaced, and the one or more first proximity sensors may be capacitive sensors or electromagnetic induction sensors.

With the above configuration, it is possible to accurately detect the contact between the suction portion and the object, and the amount of deformation of the suction portion, regardless of the physical properties of the object such as the permittivity and the magnetic permeability of the object.

In the suction apparatus according to one or more embodiments, the suction portion may be grounded.

With the above configuration, the electrostatic capacitance of the suction portion is increased, and the electric potential of the suction portion is stabilized, so that the influence of disturbance may be reduced. Accordingly, the detection accuracy is improved.

According to one or more embodiments, it may be possible to provide a sensor assembly that is attachable to a suction apparatus, and may measure an amount of deformation of a suction portion.

DETAILED DESCRIPTION

An embodiment according to one aspect of the present invention (hereinafter, also referred to as "present embodiment") will be described with reference to the drawings.

1. Application example

Figure 1:
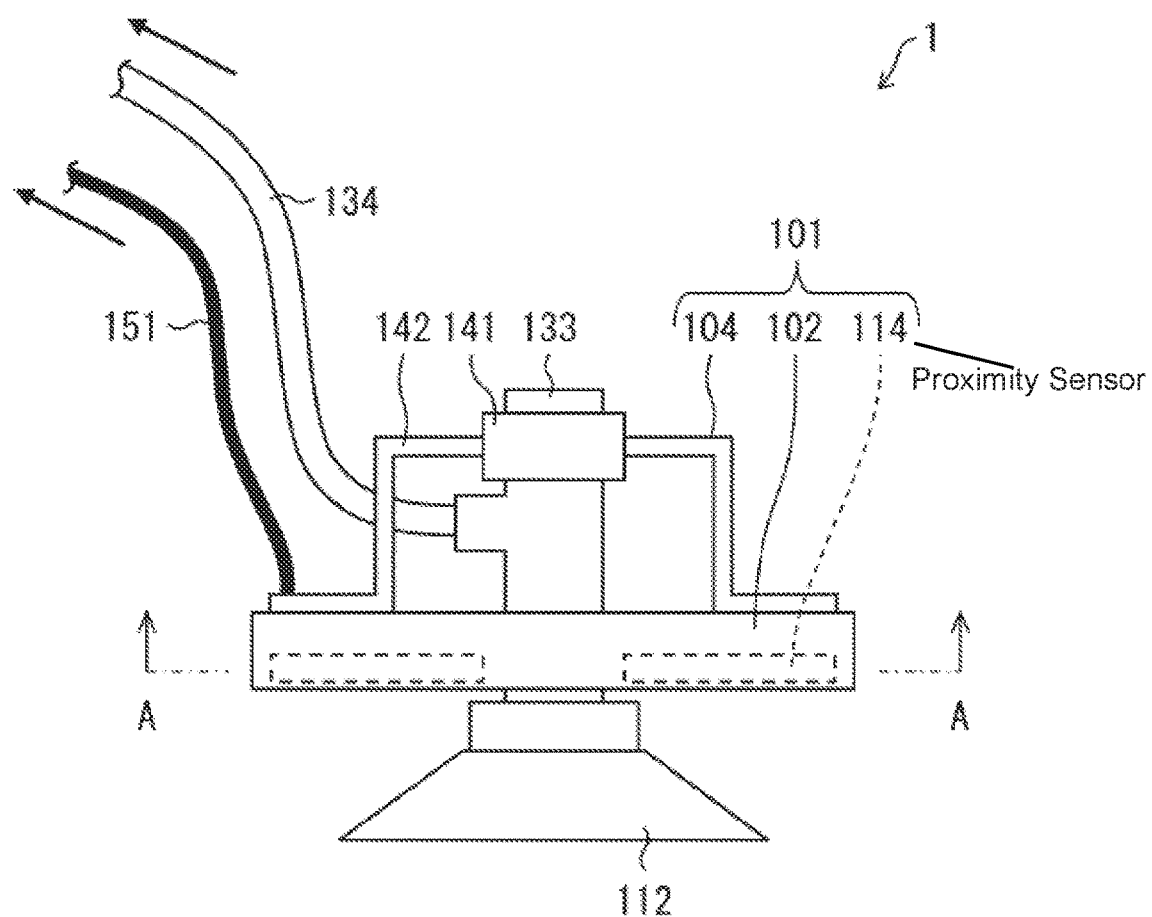
FIG. 1 is a diagram illustrating an example of a configuration of a suction apparatus according to one or more embodiments.

First, an example of a situation to which the present invention is applied will be described with reference to FIG. 1. FIG. 1 is a diagram illustrating an example of the configuration of a suction apparatus 1 according to the present embodiment. The suction apparatus 1 can be used as a mobile robot that conveys an object.

As shown in FIG. 1, the suction apparatus 1 includes a sensor assembly 101, a suction portion 112 that suctions an object with negative pressure, a shaft 133 that supports the suction portion 112 and has an air passage, and a tube 134 connected to the air passage. Examples of the suction portion 112 include a suction pad that holds an object by suctioning the object with negative pressure.

The sensor assembly 101 is attachable to the suction apparatus 1, and includes a main body 102, one or more first proximity sensors 114, and a fixture 104. A space through which the shaft 133 passes is formed in the main body 102. The first proximity sensor 114 is disposed on the main body 102, and detects the suction portion 112 that is deformed with negative pressure. The fixture 104 has a fixed portion 141 that is fixed to the shaft 133, and a support portion 142 that supports the main body 102.

The first proximity sensor 114 may be a sensor capable of measuring a short distance, or may also be a sensor capable of measuring a certain distance. Examples of a detection method of the first proximity sensor 114 include a capacitive method, an optical method, an electromagnetic induction method, and an acoustic method such as a sound wave method or an ultrasonic method. Also, examples of the capacitive sensor include a self-capacitive sensor and a mutual capacitive sensor. The one or more first proximity sensors provided in the sensor assembly may be of the same type, or may also be of the different types.

The sensor assembly 101 is attachable to the shaft 133 of the suction apparatus 1 that supports the suction portion 112 and has the air passage, and the first proximity sensor 114 can be disposed on the suction portion 112. The first proximity sensor 114 measures the amount of deformation of the suction portion 112 that is deformed by negative pressure. By measuring the amount of deformation, it is possible to accurately determine whether or not the suction portion 112 is in a state in which it is possible to suction an object (workpiece) 61. Furthermore, it is not necessary to change the design of the end effector of the suction apparatus 1 every time the sensor assembly 101 is attached to the suction apparatus 1.

2. Configuration example

Suction Apparatus

Figure 2:
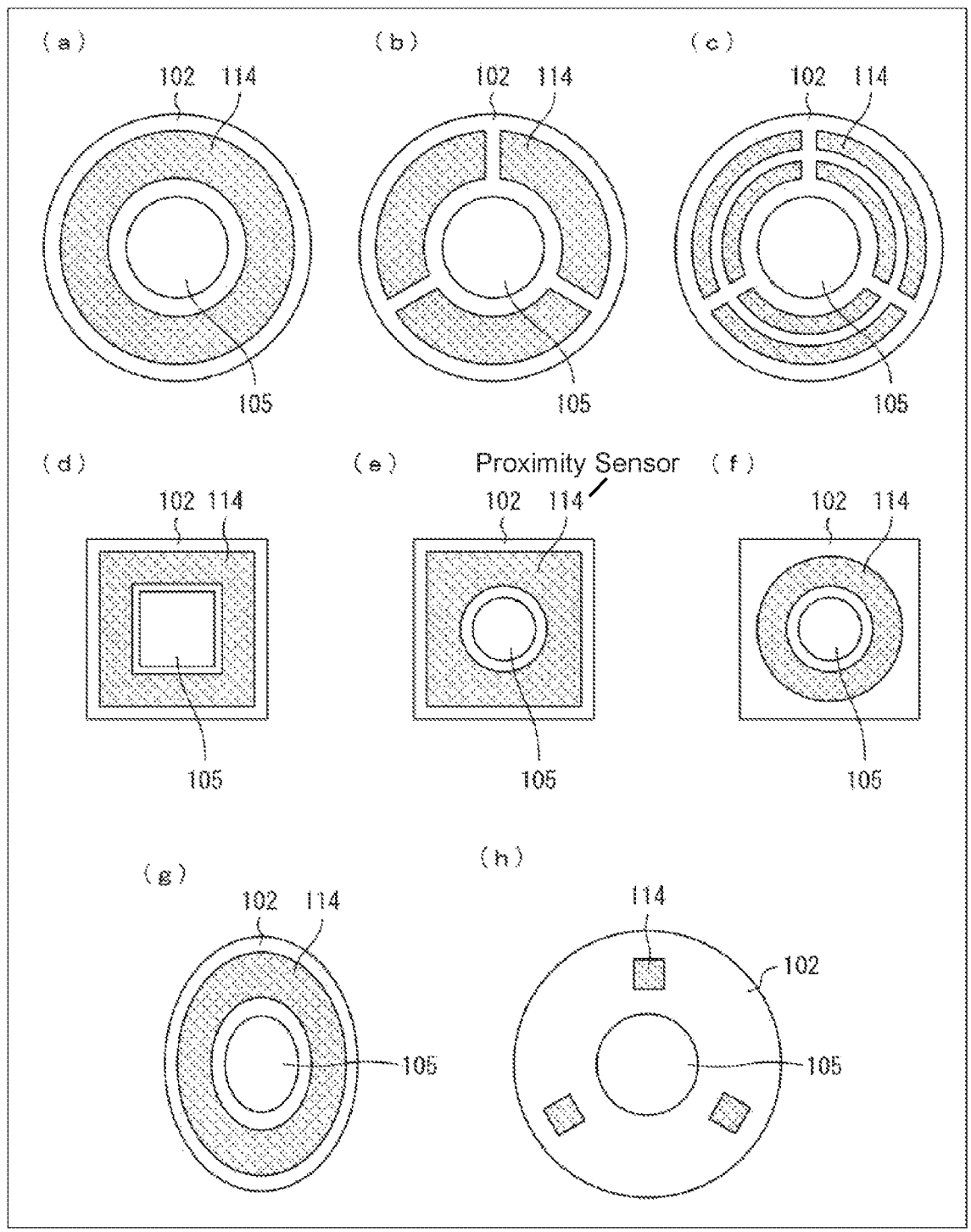
FIG. 2 is a diagram illustrating a cross-sectional view taken along line A-A of FIG. 1.

Hereinafter, the configuration of the suction apparatus 1 according to an embodiment of the present invention will be described with reference to FIG. 1. FIG. 1 is a diagram illustrating examples of the configuration of the suction apparatus 1 according to the present embodiment. FIG. 2 illustrates examples of the sensor assembly 101 in a cross-sectional view taken along line A-A of FIG. 1.

In the example of FIG. 1, the suction apparatus 1 includes a sensor assembly 101, a suction portion (suction pad) 112, and a shaft 133. An air passage for suctioning air is provided in the shaft 133. The air passage is connected to the suction portion 112 and a tube 134. The shaft 133 and a vacuum pump that generates negative pressure may also be connected via the tube 134. The suction portion 112 of the suction apparatus 1 may also be grounded.

Because the suction portion 112 is disposed on one side of the shaft 133, the position where the sensor assembly 101 is attached to the shaft 133 is preferably the other end side of the shaft 133, for example. However, in order to accurately detect the deformation of the suction portion 112, the main body 102 is preferably disposed at a position close to the suction portion 112, for example.

The support portion 142 of the fixture 104 extends from the fixed portion 141 toward the suction portion 112. The main body 102 is disposed on a suction portion 112 side with respective to the fixed portion 141 using the support portion 142. With this configuration, it is possible to fix the fixture 104 to the other end side (the opposite side to the suction portion 112) of the shaft 133, and to dispose the sensor assembly 101 at a position close to the suction portion 112.

Sensor Assembly

In the example of FIG. 1, the sensor assembly 101 includes the main body 102, one or more first proximity sensors 114, and the fixture 104.

A space 105 (not shown) through which the shaft 133 of the suction apparatus 1 passes is formed in the main body 102. The space 105 may be a hole, or may also be a notch. The main body 102 is not in contact with the shaft 133, for example. The main body 102 may have a circular shape, a quadrangular shape, or an elliptical shape. In addition, the space 105 may have a circular shape, a quadrangular shape, or an elliptical shape. The main body 102 and a controller such as a programmable logic controller (PLC) may be connected via a sensor wiring 151.

In the example of FIG. 2(*a*), the first proximity sensor 114 is disposed on the main body 102 along the circumferential direction of the space 105 (the shaft 133). In the example of FIG. 2(*b*), a plurality of the first proximity sensors 114 are disposed on the main body 102 along the circumferential direction of the space 105 (the shaft 133). In the example of FIG. 2(*c*), a plurality of the first proximity sensors 114 are disposed on the main body 102 along the circumferential direction and the radial direction with respect to the space 105 (the shaft 133). In the example of FIG. 2(*d*), the space 105 has a quadrangular shape, and the first proximity sensor 114 is disposed on the main body 102 having a quadrangular outer shape. In the example of FIG. 2(*e*), the space 105 has a circular shape, and the first proximity sensor 114 is disposed on the main body 102 having a quadrangular outer shape. In the example of FIG. 2(*f*), the first proximity sensor 114 is disposed on the quadrangular main body 102 in which the space 105 has a circular shape. In the example of FIG. 2(*g*), the first proximity sensor 114 is disposed on the elliptical main body 102 in which the space 105 has an elliptical shape. In the example of FIG. 2(*h*), a plurality of the first proximity sensors 114 that are sensor chips are disposed on the main body 102 along the circumferential direction of the space 105 (the shaft 133).

Figure 3:
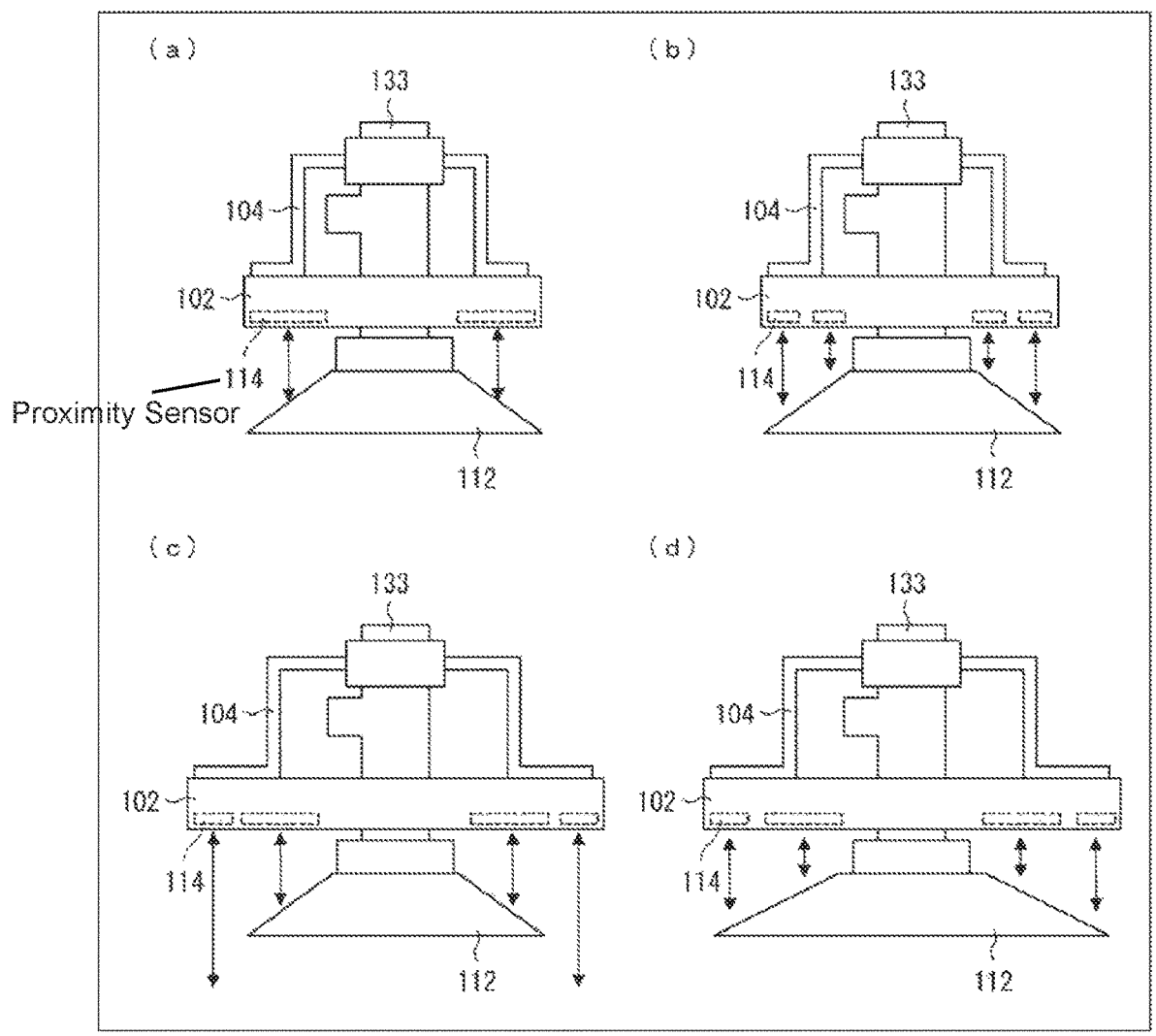
FIG. 3 is a diagram illustrating an example of a configuration of a sensor assembly according to one or more embodiments.

FIG. 3 illustrates an example of the configuration of the sensor assembly 101. In the example of FIG. 3(*a*), the sensor assembly 101 includes the main body 102 shown in the example of FIG. 2(*a*). The first proximity sensor 114 provided in the main body 102 can measure the amount of displacement of the suction portion 112. The first proximity sensor 114 is disposed above the suction portion 112. In the example of FIG. 3(*b*), the sensor assembly 101 includes the main body 102 shown in the example of FIG. 2(*c*). The plurality of first proximity sensors 114 are disposed on the main body 102 along the radial direction with respect to the shaft 133. With this configuration, the sensor assembly 101 can individually detect displacement at a plurality of positions in the radial direction of the suction portion 112. In the example of FIG. 3(*c*), the sensor assembly 101 includes the main body 102 shown in the example of FIG. 2(*c*). The main body 102 includes one or more third proximity sensors (first proximity sensors 114) that are disposed radially outward of the first proximity sensors 114 with respect to the axis 133, and that detect an object. Because the main body 102 includes these third proximity sensors, in addition to measurement of the amount of displacement of the suction portion 112 using the first proximity sensors 114, the state of the object to be suctioned with the suction portion 112 can also be measured by the third proximity sensors (first proximity sensors 114). As a result, the detection accuracy can be improved, and the operation speed of the suction apparatus can be increased. The example of FIG. 3(*d*) shows a configuration in which the suction portion 112 shown in FIG. 3(*c*) is replaced with another larger suction portion 112. The sensor assembly 101 includes a plurality of the first proximity sensors 114 that are arranged along the radial direction. Accordingly, the sensor assembly 101 can detect deformation of (the outer end portion of) the suction portion 112, with respect to suction portions 112 having a plurality of sizes. Also, when the sensor assembly 101 includes the main body 102 shown in the example of FIG. 2(*c*), the plurality of first proximity sensors 114 are disposed in a circle covering the suction portion 112. With this configuration, an appropriate proximity sensor can be selected in accordance with the size of the main body.

Figure 4:
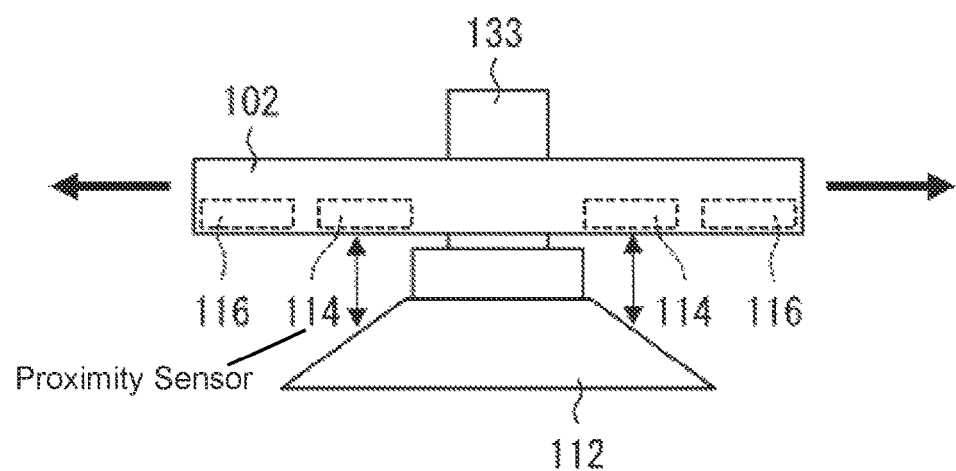
FIG. 4 is a partially enlarged diagram illustrating an example of a configuration of a sensor assembly according to one or more embodiments.

FIG. 4 is a diagram illustrating an example of the configuration of the sensor assembly 101. In FIG. 4, the fixture 104 is not shown. In the example of FIG. 4, the first proximity sensor 114 is provided in the vicinity of the main body 102 along the circumferential direction of the shaft 133 (along the space 105). In addition, at least one second proximity sensor 116 may also be disposed on a side surface of the main body 102. The side surface is in the radial direction with respect to the shaft 133. The second proximity sensor 116 has a detection range to the side (radial direction) of the sensor assembly 101, and detects objects approaching the side surface of the sensor assembly 101. With this configuration, for example, it is possible to prevent collisions between the suction apparatus 1 and objects approaching the suction apparatus 1. A plurality of the second proximity sensors 116 may also be arranged along the circumferential direction of the shaft 133. By disposing the plurality of second proximity sensors 116 along the circumferential direction of the shaft 133, it is possible to widen a range in which objects around the sensor assembly 101 can be detected.

Figure 5:
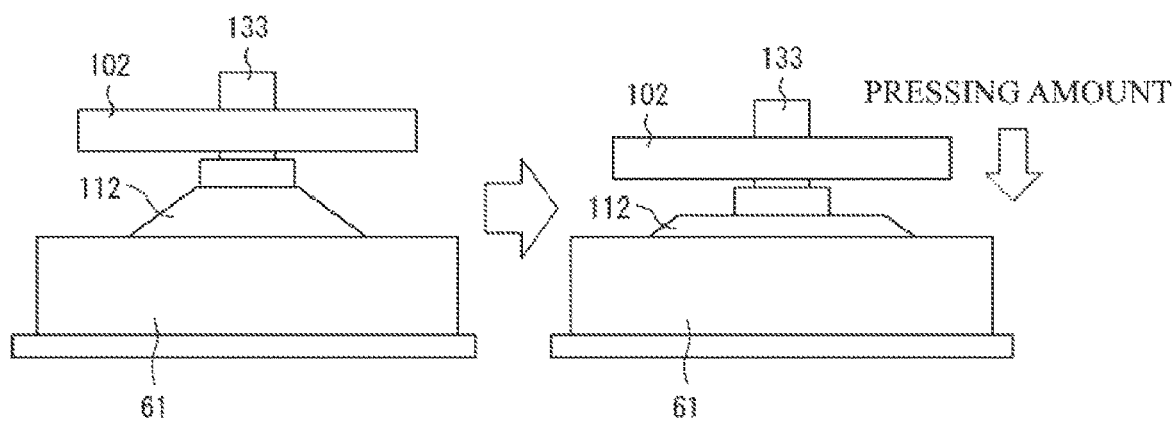
FIG. 5 is a diagram illustrating a change in the positional relationship between a suction apparatus and an object to be suctioned.

FIG. 5 is a diagram showing a change in the positional relationship between the suction apparatus and an object 61 to be suctioned. In FIG. 5, the fixture 104 is not shown. The amount of pressing at the position where the suction portion 112 (pad) is in contact with the object 61 (workpiece) is zero. The amount of pressing indicates a distance by which the suction portion 112 is further pressed against the object 61 from the contact position.

Figure 6:
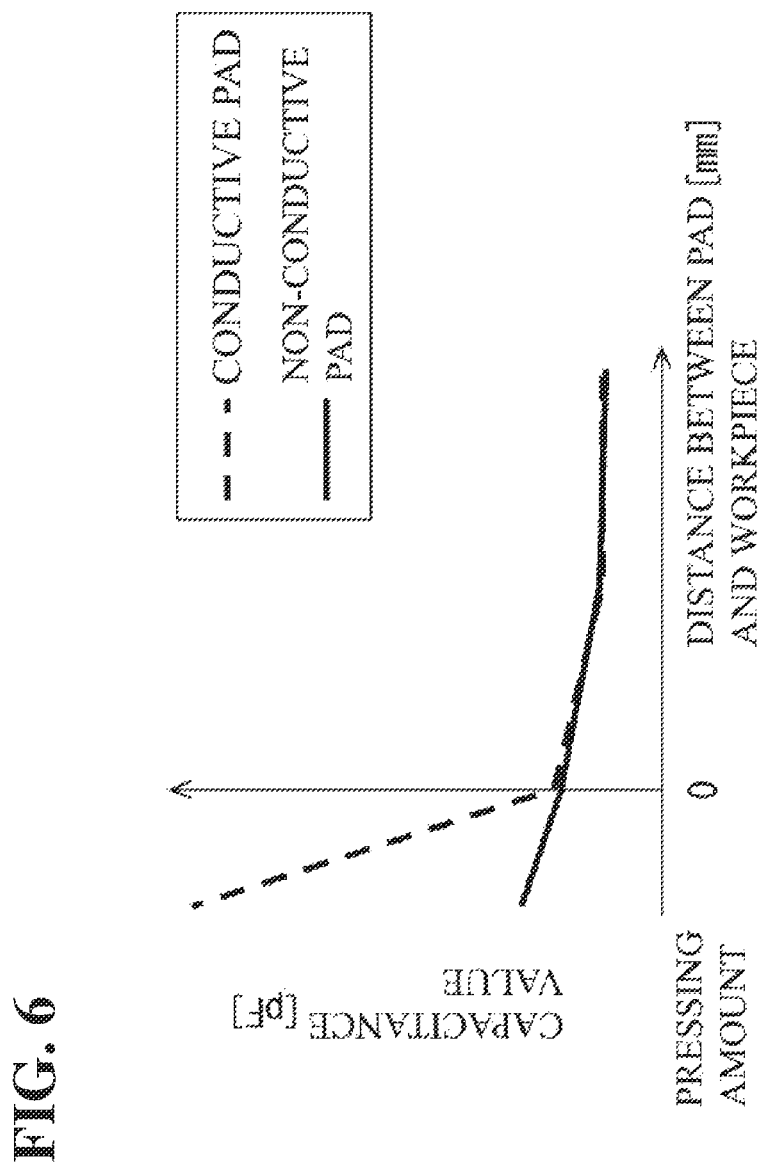
FIG. 6 is a diagram illustrating an example of the result of a measurement of a capacitance value performed by a sensor assembly according to one or more embodiments related to detection of an object having a low permittivity.

FIG. 6 illustrates an example of the result of the measurement of the capacitance value performed by the sensor assembly 101, related to detection of an object 61 having a low permittivity. An example of an object having a low permittivity is an object made of plastic. In the example of FIG. 6, the vertical axis indicates the capacitance value (pF). The horizontal axis indicates the distance (mm) between the suction portion 112 (pad) and an object (workpiece). A distance of 0 mm between the suction portion 112 and the object indicates that the suction portion 112 and the workpiece are in contact with each other. A negative distance between the suction portion 112 and the object indicates that the suction portion 112 is pressed against the object 61, and the suction portion 112 is deformed. In this example, the first proximity sensor is a capacitive sensor. The capacitance value detected by the first proximity sensor increases, as the suction portion 112 approaches the object 61 from a distant position.

A case where the suction portion 112 is a conductive pad that includes a conductive member at a position to be deformed will be described. When the suction portion 112 has come into contact with an object, and the suction portion 112 is further pressed against the object, the electrostatic capacitance detected by the first proximity sensor 114 rapidly increases. This is because the distance between the main body 102 and the deformed suction portion 112 decreases, due to the pressing. In other words, this is because the first proximity sensor 114 and the conductive member of the suction portion 112 approach each other. Therefore, when the suction portion 112 includes a conductive member at a position to be displaced and at least one of the first proximity sensors 114 is a capacitive sensor, contact between the suction portion 112 and an object, and the amount of deformation of the suction portion 112 can be accurately detected, regardless of the permittivity of the object (workpiece).

Next, a case where the suction portion 112 is a non-conductive pad will be described. In this case, even if the suction portion 112 comes into contact with an object, and the suction portion 112 is pressed against the object, the electrostatic capacitance detected by the first proximity sensor 114 does not change rapidly. When the suction portion 112 is a non-conductive pad, the influence of the suction portion 112 is relatively small. The capacitance value slightly increases after the contact between the suction portion 112 and the object mainly due to the electrostatic capacitance of the object.

Therefore, when the suction portion 112 is a conductive pad, the amount of deformation of the suction portion 112 can be accurately detected, regardless of the permittivity of an object. With this configuration, a control apparatus (not shown) of the suction apparatus can determine whether or not the suction portion 112 is appropriately pressed against the object 61 (whether or not the suction portion 112 is suctioning the object 61 in a correct orientation).

Mobile suction apparatus

Next, with reference to FIGS. 7(a) and 7(b), an example of a hardware configuration of the mobile suction apparatus 100 including the suction apparatus according to the present embodiment will be described.

Figure 7:
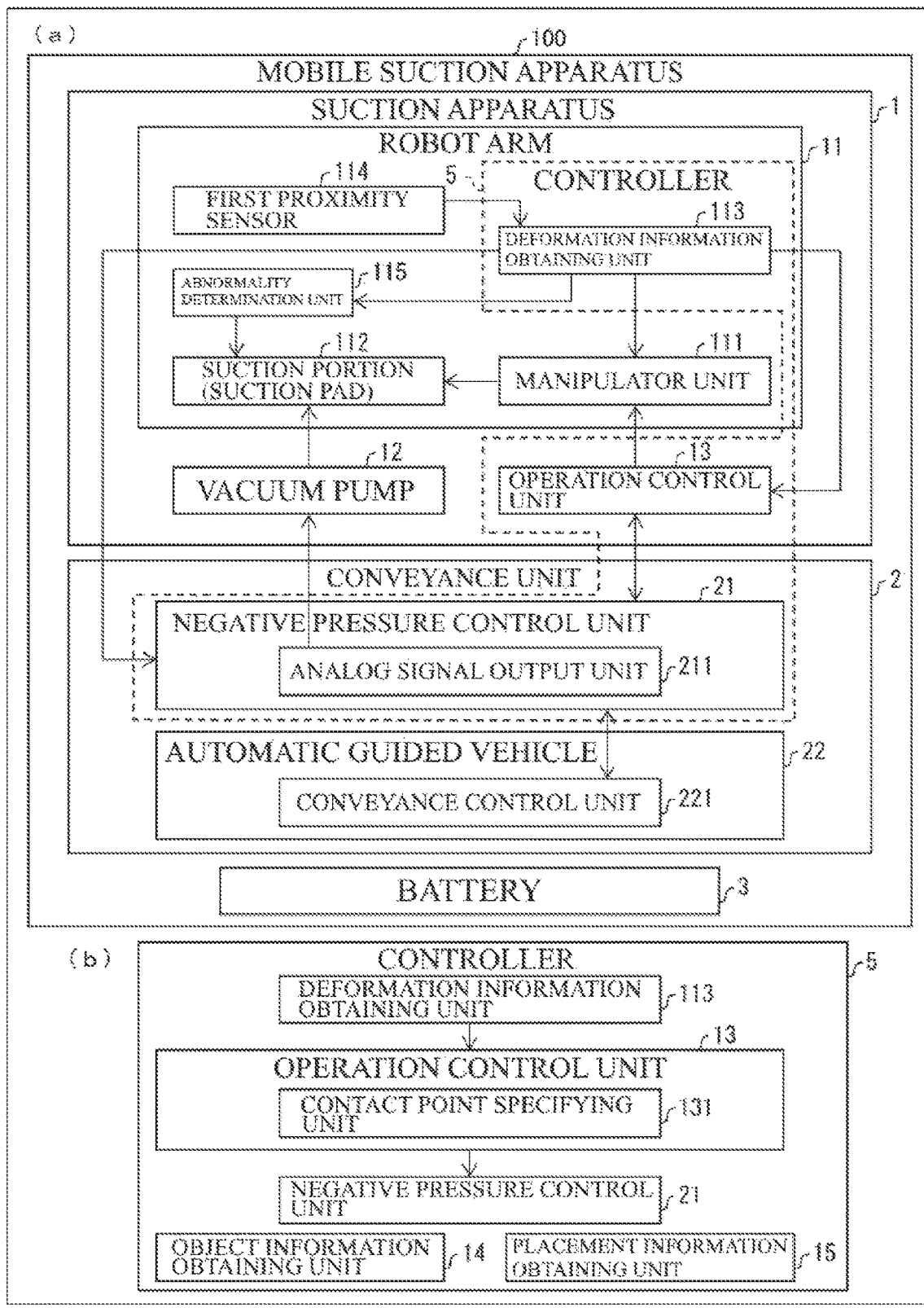
FIG. 7 is a schematic diagram illustrating an example of a hardware configuration of a mobile suction apparatus according to one or more embodiments.

FIG. 7 is a block diagram schematically illustrating an example of the configuration of the mobile suction apparatus 100 according to the present embodiment. In the example shown in FIG. 7, the mobile suction apparatus 100 according to the present embodiment includes a suction apparatus 1, a conveyance unit 2, and a battery 3.

Suction Apparatus

The suction apparatus 1 includes a robot arm 11, a vacuum pump 12, and an operation control unit (manipulator control unit) 13.

Robot Arm

In the example shown in FIG. 7, the robot arm 11 includes a manipulator unit 111, a suction pad 112, a deformation information obtaining unit (manipulator-speed subtraction command value calculation unit) 113, and the operation control unit.

Manipulator Unit

The manipulator unit 111 is driven together with the suction pad 112 of the robot arm 11, under the control of the operation control unit 13. The manipulator unit 111 includes, for example, one or more joints.

Suction Pad

When the suction pad 112 is positioned at the work position by the driving of the manipulator unit 111, the suction pad 112 performs an operation of gripping an object by suctioning the object with negative pressure corresponding to the amount of driving of the vacuum pump 12.

Deformation Information Obtaining Unit

The deformation information obtaining unit 113 obtains information on deformation of the suction pad 112. The deformation information obtaining unit 113 obtains, for example, data indicating the amount of deformation of the suction pad 112 from the first proximity sensor 114, and specifies the amount of deformation of the suction pad 112. A specific example of the amount of deformation will be described later.

The deformation information obtaining unit 113 outputs, to the manipulator control unit 13 and the negative pressure control unit 21, deformation data such as the amount of deformation, the speed of deformation, or the acceleration of deformation of the suction pad 112.]

Abnormality Determination Unit

An abnormality determination unit 115 may also determine that the object is stuck to the suction pad 112, if the amount of deformation of the suction pad 112 after a predetermined period of time has elapsed since the suction pad 112 stopped suctioning the object and has separated the object is greater than or equal to a predetermined amount. In other words, the abnormality determination unit 115 may also determine that the object is stuck to the suction pad 111, if the amount of deformation of the suction pad 112 after a predetermined period of time has elapsed since the space between the suction pad 112 and the object is no longer in the vacuum state (that is to say, the vacuum is broken) is greater than or equal to the predetermined amount.

In this case, the abnormality determination unit 115 may issue an alert or cause the suction pad 112 to perform an operation of dropping the object (placing operation). In this manner, it is possible to prevent a failure of the placement due to the fact that the object does not separate from the suction pad 112 by being stuck to the suction pad 112 after the vacuum breakdown.

Vacuum Pump

The vacuum pump 12 generates negative pressure in accordance with the amount of driving and provides the negative pressure to the suction pad 112. Here, an example in which the suction apparatus 1 in the mobile suction apparatus 100 includes the vacuum pump 12 will be described. In the present embodiment, the suction apparatus 1 in the mobile suction apparatus 100 may not include the vacuum pump 12, and for example the vacuum pump 12 may also be provided outside the suction apparatus 1 and the mobile suction apparatus 100. Also with this configuration, the negative pressure control unit 21 controls the amount of driving of the vacuum pump 12, so that the same effects as those in the above-described example can be achieved.

Operation Control Unit

The operation control unit 13 includes a central processing unit (CPU), a random access memory (RAM), a read only memory (ROM), or the like, and preforms control in response to an information process. The manipulator control unit 13 controls the manipulator unit 111 of the robot arm 11, based on the manipulator control signal output from the negative pressure control unit 21. In this manner, the manipulator control unit 13 moves the suction pad 112 using the manipulator unit 111. Specifically, the manipulator control unit 13 drives the manipulator unit 111 so that the suction pad 112 of the robot arm 11 is located at a work position where the suction pad 112 can suction the object. Also, the manipulator control unit 13 may also operate the manipulator unit 111 so that the angle of the suction pad 112 with respect to the object reaches a predetermined angle, after the suction pad 112 is positioned at the work position. In this manner, the position of the suction pad 112 can be finely adjusted to a more suitable position. In addition, after the suction pad 112 has suctioned the object, the manipulator control unit 13 drives the manipulator unit 111 so that, for example, the suction pad 112 of the robot arm 11 is positioned at the position of a predetermined box (not illustrated) installed on the upper portion of the manipulator control unit 13.

Furthermore, the manipulator control unit 13 may also determine the direction in which the suction pad 112 is moved to suction the object again, based on a plurality of amounts of deformation at a plurality of positions in the suction pad 112.

In the pick-up operation (suction operation) of the object with the suction pad 112, the mobile suction apparatus 100 measures the positional relationship between the object and the mobile suction apparatus 100 by two-dimensional vision, three-dimensional vision, or the like, and the suction pad 112 performs the pick-up operation of the object, in order to prevent variation in the stop position of the mobile suction apparatus 100 after traveling of the mobile suction apparatus 100. In this case, there is a risk that an error in picking up the object by the suction pad 112 may occur due to a measurement error in the positional relationship between the object and the mobile suction apparatus 100.

In contrast, with the above-described configuration, even when the suction pad 112 is not in intimate contact with the object, the suction pad 112 can be moved in the direction in which the object is suctioned again. As a result, it is possible to prevent an error of picking up the object with the suction pad 112.

When the amount of deformation of the first portion is larger than the amount of deformation of the second portion among the plurality positions of the suction pad 112, the manipulator control unit 13 may also move the suction pad 112 to the first portion side (the side opposite to the placement position of the sensor that has detected the smaller amount of deformation) from the second portion, in order to suction the object again. In this manner, it is possible to suitably prevent misalignment of the suction position of the suction pad 112. As a result, it is possible to prevent an error of picking up the object by the suction pad 112 better.

Operation Control Unit

The operation control unit 13 may further include a contact point specifying unit 131. The contact point specifying unit 131 specifies a contact point where the suction pad 112 contacts the object, based on the deformation (amount of deformation, speed of deformation, or acceleration of deformation) of the suction pad 112. In addition, the contact point specifying unit 131 specifies a contact point where the object contacts the surface on which the object is to be placed, based on the deformation (amount of deformation, speed of deformation, or acceleration of deformation) of the suction pad 112 in a state where the suction pad 112 is suctioning the object. According to the above configuration, even if there is a measurement error in the position and orientation relationship between the object and the mobile suction apparatus 100, the measurement error can be canceled by the operation control unit 13 causing the manipulator unit 111 to tilt the orientation of the suction portion (suction pad) 112 toward the suction surface side taking the contact point that is specified by the contact point specifying unit 131 as a fulcrum. As a result, it is possible to better prevent an error of picking up the object by the suction portion 112.

Conveyance Unit

The conveyance unit (automated guided vehicle) 2 includes a negative pressure control unit (control signal output unit) 21 and an automated guided vehicle 22.

Negative Pressure Control Unit

The negative pressure control unit 21 includes a central processing unit (CPU), a random access memory (RAM), a read only memory (ROM), or the like, and preforms control in response to an information process. The negative pressure control unit 21 includes, for example, a programmable logic controller (PLC) or a microcontroller. The negative pressure control unit 21 controls the vacuum pump 12 that generates negative pressure, based on an output signal that is received from the one or more first proximity sensors 114 in the deformation information obtaining unit 113, and a conveyance state signal that is received from the conveyance control unit 221 in the automated guided vehicle 22.

The negative pressure control unit 21 controls ON and OFF of the vacuum pump 12 based on a signal that is output from the operation control unit 13. If it is determined from the deformation of the suction pad 112 that the suction pad 112 has sufficiently pressed against the object when picking up the object, for example, the negative pressure control unit 21 turns ON the vacuum pump. Also, when the object is to be placed on the table, if the operation control unit 13 determines that the entire bottom surface of the object is in contact with the surface of the table on which the object is to be placed, the negative pressure control unit 21 turns OFF the vacuum pump.

In addition, the negative pressure control unit 21 outputs a manipulator control signal for causing the manipulator control unit 13 to control the manipulator unit 111.

Furthermore, the negative pressure control unit 21 may also include an analog signal output unit 211 that outputs an analog signal as a control signal for the vacuum pump 12. The analog signal output unit 211 may also perform control to monotonically increase or monotonically decrease the analog signal. In this manner, the amount of driving of the vacuum pump 12 can be changed in a slope shape, so that a rush current can be reduced. In addition, power consumption can be reduced and control can be stabilized.

Automated Guided Vehicle

In the example of FIG. 7, the automated guided vehicle 22 includes a conveyance control unit 221. The conveyance control unit 221 controls the movement (conveyance) of the mobile suction apparatus 100 by controlling the conveyance of the automated guided vehicle 22. The conveyance control unit 221 moves, for example, the mobile suction apparatus 100 to a work position where the robot arm 11 can grip the object. Also, when the mobile suction apparatus 100 has already been positioned at the work position, the conveyance control unit 221 does not move the mobile suction apparatus 100. In addition, the automated guided vehicle 22 transmits a conveyance state signal, which is a signal indicating the conveyance state of the automated guided vehicle 22, to the negative pressure control unit 21.

Battery

The battery 3 controls the units of the mobile suction apparatus 100, that is to say, the suction apparatus 1 and the conveyance unit 2, by supplying power to these units of the mobile suction apparatus 100.

In the above example, the mobile suction apparatus 100 is configured to operate with the battery 3, but there is no limitation to the present embodiment. In the present embodiment, the mobile suction apparatus 100 may also be configured such that power is supplied from the outside of the mobile suction apparatus 100 through a power cord.

Controller

The controller 5 includes the deformation information obtaining unit 113 that obtains information on the deformation of the suction pad 112, and the operation control unit 13 that controls the movement of the suction pad 112 in accordance with the deformation of the suction pad 112. In other words, the operation control unit 13 changes the movement (movement direction, speed, and/or inclination) of the suction pad 112 in accordance with the deformation of the suction pad 112.

The controller 5 further includes an object information obtaining unit 14 that obtains information about an object, and a placement information obtaining unit 15 that obtains information about a table on which the object is to be placed.

The controller 5 may be provided in the mobile suction apparatus 100, or may also be provided separately from the mobile suction apparatus. The controller 5 may also be configured to be capable of communicating with the mobile suction apparatus, and to transmit a control signal for controlling the mobile suction apparatus to the mobile suction apparatus, for example.

3. Operation Examples

Hereinafter, various operation examples of the suction apparatus 1 according to the present invention will be described.

Before describing specific operation examples, the definition of the amount of deformation of the suction pad 112 will be described.

Definition of Amount of Deformation of Suction Pad 112

Next, the definition of the amount of deformation of the suction pad 112 will be described with reference to FIGS. 8 and 9.

Figure 8:
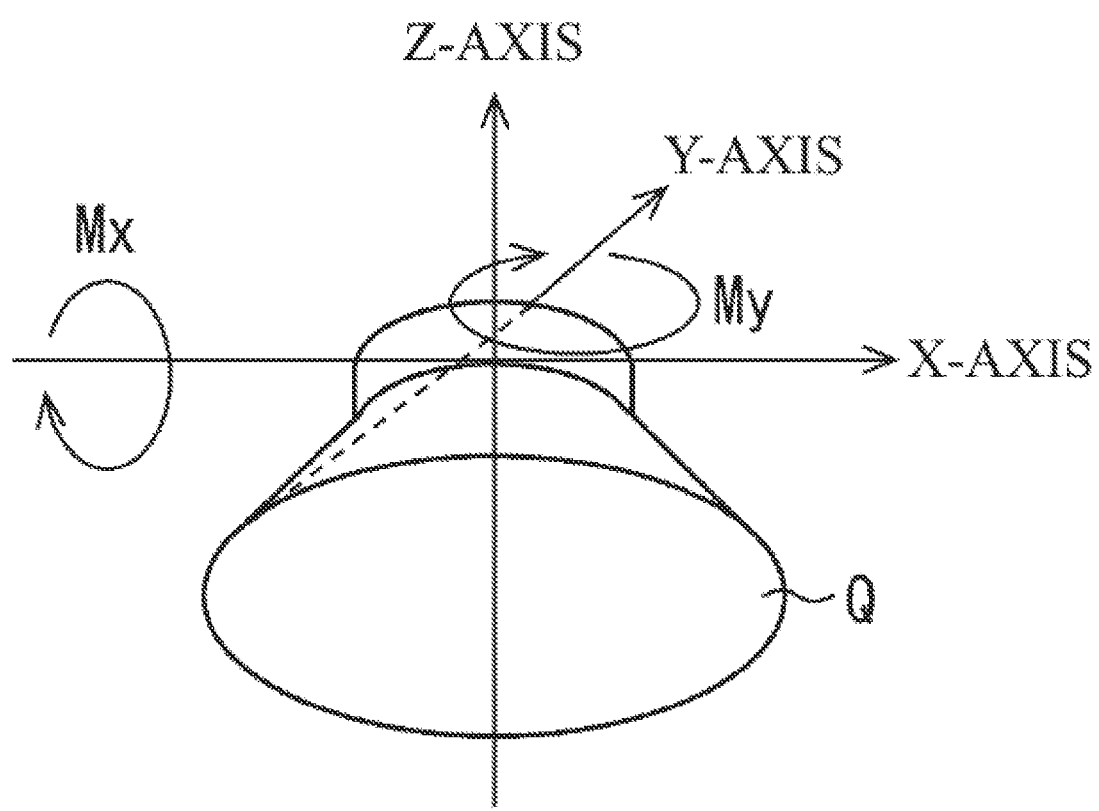
FIG. 8 is a diagram illustrating a definition of an amount of deformation of a suction pad one or more embodiments.

FIG. 8 is a diagram illustrating the definition of the amount of deformation of the suction pad that is used in the embodiment of the present invention. First, a definition 1 of the amount of deformation of the suction pad 112 will be described with reference to FIG. 8.

As described above, the suction pad 112 has a substantially conical shape whose lower side (suction surface) Q is open. Here, a plane including a circular end portion of the suction pad 112 that is to be brought into contact with an object is referred to as "suction surface". Also, the X-axis and the Y-axis extend in two directions perpendicular to each other and parallel to the suction surface of the suction pad when it is not deformed, and the Z-axis is taken in a direction normal to the suction surface of the suction pad when it is not deformed. In the definition 1 of the amount of deformation of the suction pad 112, the inclination of the suction surface of the suction pad 112 is represented by the amount of rotation Mx about the X-axis and the amount of rotation My about the Y-axis. In the definition 1, the amount of deformation of the suction pad 112 is represented by Mx, My, and the amount of pressing Z in the Z-axis direction.

Figure 9:
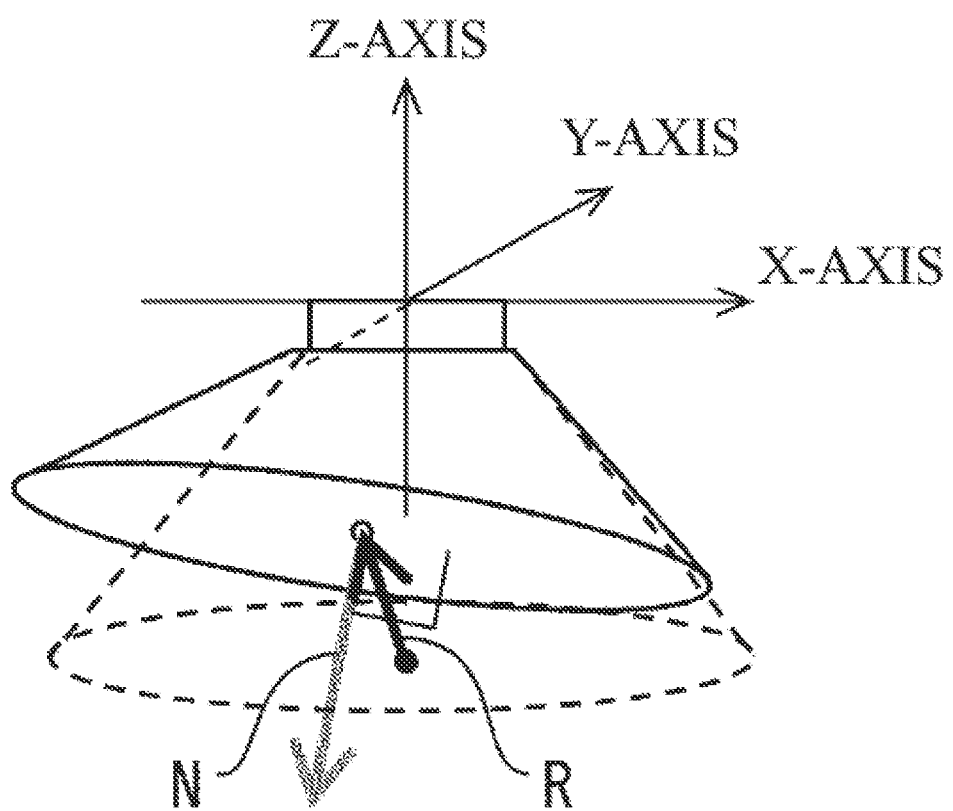
FIG. 9 is a diagram illustrating another definition of an amount of deformation of a suction pad in one or more embodiments.

FIG. 9 is a diagram illustrating the definition of the amount of deformation of the suction pad that is used in the embodiment of the present invention. Next, a definition 2 of the amount of deformation of the suction pad 112 will be described with reference to FIG. 9.

A vector connecting the center of the suction surface of the suction pad when it is not deformed and the center of the suction surface of the suction pad when it is not deformed is defined as R. In addition, the unit normal vector of the suction surface of the suction pad when it is not deformed is defined as N. In the definition 2, the projection of the vector N onto the X-axis is denoted by ex, the projection of the vector N onto the Y-axis is denoted by ey, and the projection of the vector R onto the Z-axis is denoted by ez. In other words, in the definition 2, the X-axis component of the vector N is ex, the Y-axis component of the vector N is ey, and the Z-axis component of the vector R is ez. In the definition 2, the amount of deformation of the suction pad 112 is represented by {ex, ey, ez}.

As for the amount of deformation of the suction pad 112, equivalent amount of information can be obtained by the definition 1 and the definition 2, but the definition 2 is used in the following description.

Hereinafter, operations such as picking up and placing of a workpiece W (an object W to be conveyed, an object 61) by the mobile suction apparatus 100 will be described with reference to FIGS. 11 to 13.

Operation Example 1

Figure 11:
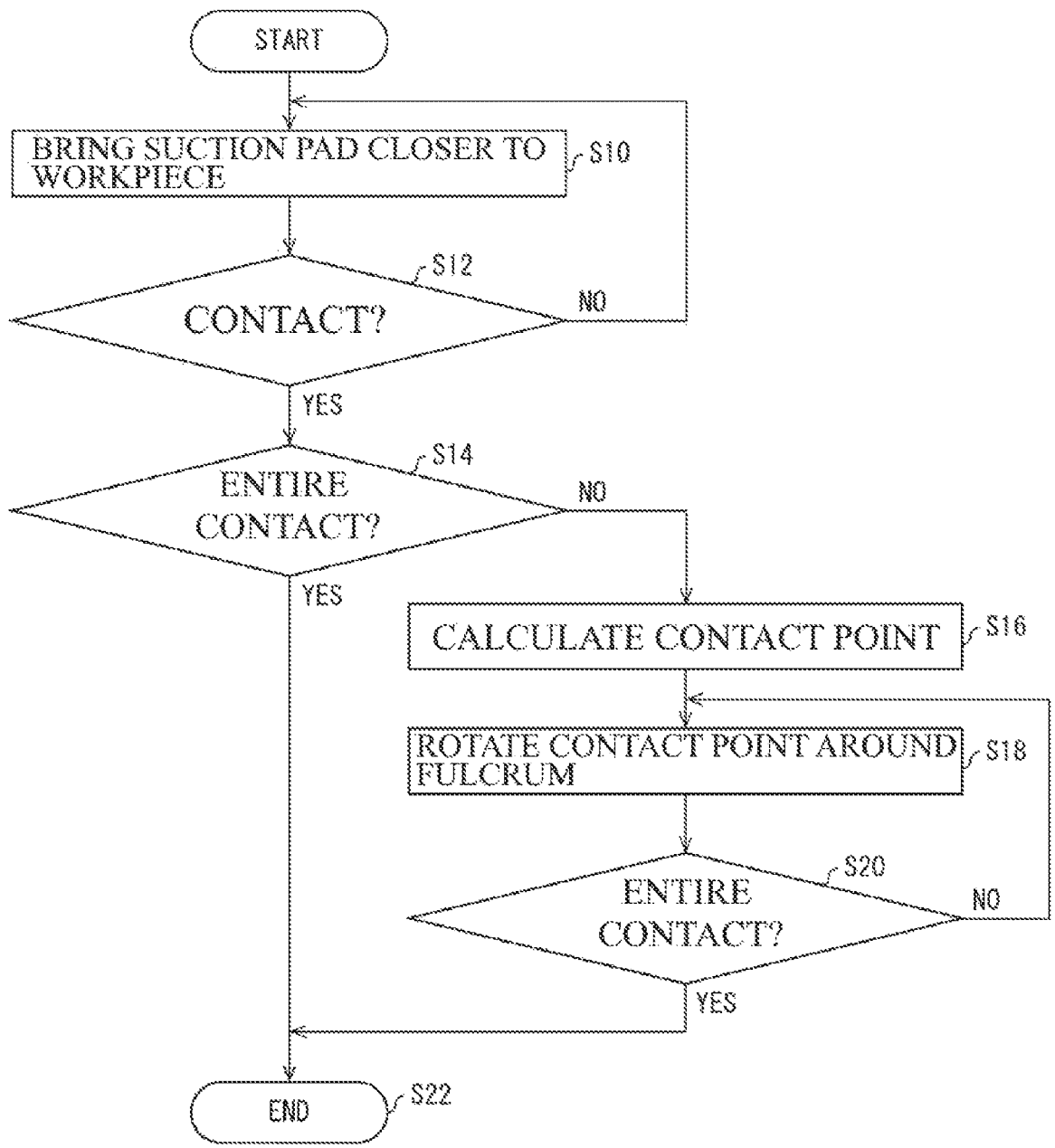
FIG. 11 is a flowchart illustrating an operation of a suction apparatus in one or more embodiments.

FIG. 11 is a flowchart showing the operation of the mobile suction apparatus 100 in the embodiment of the present invention. First, with reference to FIG. 11, an operation example in which the suction pad 112 suctions a workpiece W and picks up the workpiece W will be described.

Step S10

First, in step S10, the operation control unit 13 causes the suction pad 112 to approach the workpiece W by lowering the suction pad 112 in the vertical direction.

Step S12

Next, in step S12, the operation control unit 13 determines whether or not at least a part of the suction pad 112 has come in contact with the workpiece W. When the suction pad 112 has come into contact with the workpiece W, the suction pad 112 is inclined in the X and Y directions, and the amount of inclination of the suction pad 112 represented by the absolute value of the vector (ex, ey) exceeds a threshold value ε1 or the amount of pressing ez in the Z-axis direction exceeds a threshold value ε2. Accordingly, the following expression is satisfied:

$$|(ex,ey)|≥ε1, \text{ or } ez>ε2$$

Therefore, more specifically, in this step, the operation control unit 13 determines that the suction pad 112 has come into contact with the workpiece W if the above expression is satisfied, and otherwise determines that the suction pad 112 has not come into contact with the workpiece W.

When the operation control unit 13 determines that the suction pad 112 has come into contact with the workpiece W (YES in step S12), the process proceeds to step S14.

If the operation control unit 13 does not determine that the suction pad 112 has not come into contact with the workpiece W (NO in step S12), the process returns to step S10 and the operation control unit 13 continues the approach of the suction pad 112 to the workpiece W.

Step S14

Next, in step S14, the operation control unit 13 determines whether or not the suction pad 112 and the workpiece W are entirely in contact with each other. When the suction pad 112 is entirely in contact with the workpiece W, the inclination of the suction pad 112 is eliminated, so that the following expression is satisfied.

$$|(ex,ey)|<ε1$$

Therefore, in this step, the operation control unit 13 determines that the suction surface of the suction pad 112 is entirely in contact with the workpiece W if the above expression is satisfied, and otherwise determines that the suction surface of the suction pad 112 is not entirely in contact with the workpiece W.

If the operation control unit 13 determines that the suction surface of the suction pad 112 and the workpiece W are entirely in contact with each other (YES in step S14), the operation control unit 13 completes the control of the inclination of the suction pad 112 and shifts to the control of the amount of pressing described later.

If the operation control unit 13 does not determine that the suction surface of the suction pad 112 and the workpiece W are entirely in contact with each other (NO in step S14), the process proceeds to step S16.

Step S16

In step S16, the contact point specifying unit 131 specifies the position of the contact point between the suction pad 112 and the workpiece W, based on the deformation of the suction pad 112.

Figure 10:
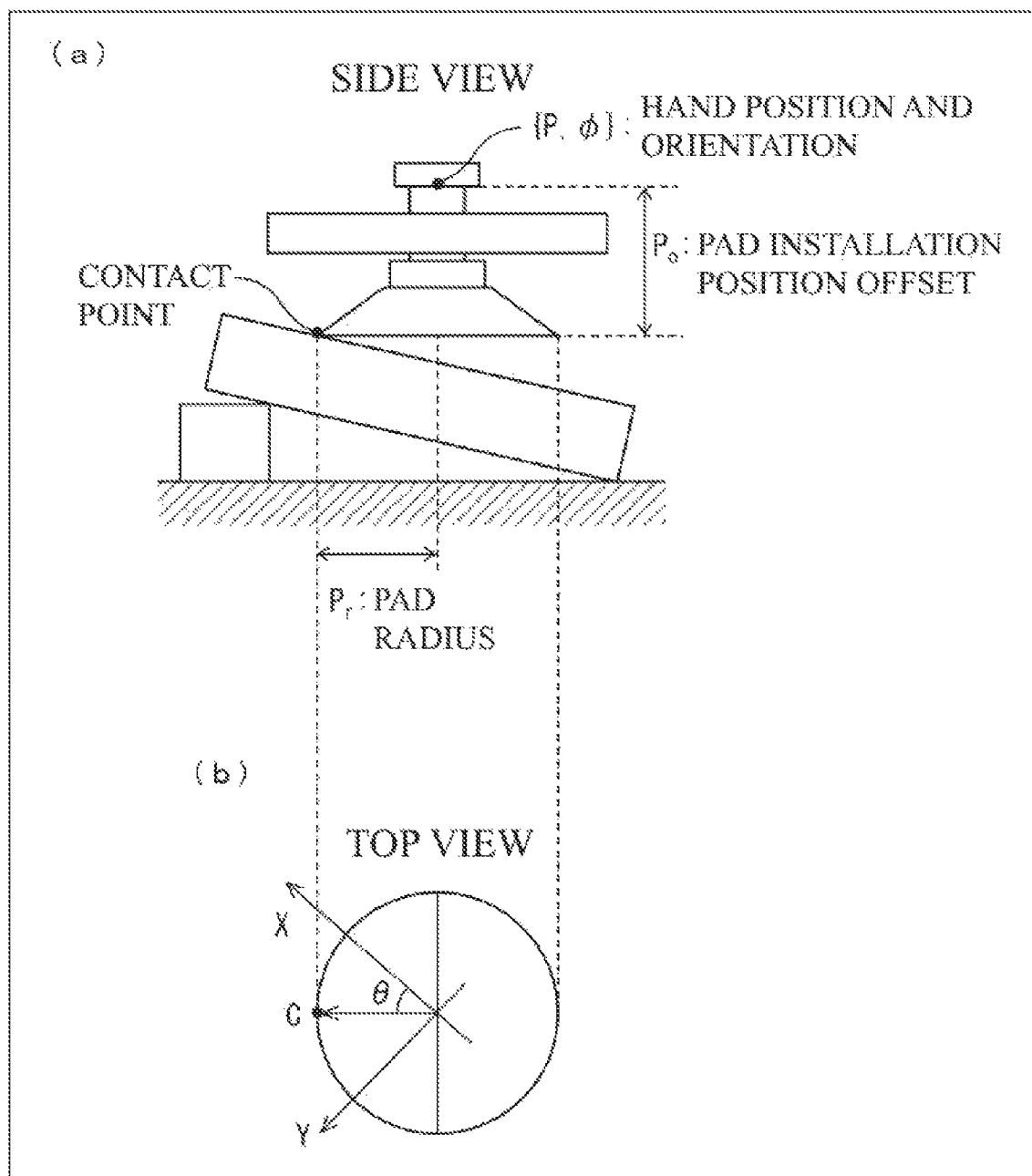
FIG. 10 is a diagram illustrating orientation control of a suction pad according to one or more embodiments.

FIG. 10(a) is a side view of the suction pad 112, and FIG. 10(b) is a top view of the suction pad 112. Here, with reference to FIG. 10, a process of specifying the position of the contact point between the suction pad 112 and the workpiece performed by the contact point specifying unit 131 will be described. Letting an angle formed by a projection of the inclination (vector N) of the suction pad 112 onto the XY plane and the X-axis be θ, θ is obtained from the following expression.

$$θ=\arctan(ey/ex)$$

The contact point specifying unit 131 specifies a contact point between the suction pad 112 and the workpiece W based on θ.

Once the contact point is specified, the process proceeds to step S18.

Step S18

In step S18, the operation control unit 13 changes the inclination of the suction pad 112 while maintaining the contact between the suction pad 112 and the workpiece W at the specified contact point. That is to say, the operation control unit 13 changes the inclination of the suction pad 112 to reduce the angle between the suction surface of the suction pad 112 and the surface to be suctioned of the workpiece W. Here, the operation control unit 13 obtains, by the following process, an operation command of the manipulator unit 111 in a case where the inclination of the suction pad 112 is changed to align the suction surface of the suction pad 112 with the surface to be suctioned of the workpiece W while maintaining the contact at the contact point.

The suction pad 112 is attachable to and detachable from the robot arm. The operation control unit 13 calculates a command speed (Pv) and a command angular velocity (φω) for controlling the position and the angle (orientation) of the conveyance hand, which is the base of the suction pad 112, as a combination (simple sum) of the following two command values. The command angular velocity (φω) is a change speed of the angle of the conveyance hand.

1. A command speed Pv (more specifically, a command speed vector) for maintaining the contact between the suction pad 112 and the workpiece W at the contact point.

$$Pv=(Pvr-Gv·ez)h$$

Here, Pvr is the target speed of the suction pad 112, Gv is a constant gain, ez is the Z-axis component of the normal vector R representing the inclination of the suction pad 112, and h is the direction vector of the hand orientation (φ). Also, "–" represents multiplication.

2. Command speed (Pv) and command angular velocity (φω) for rotating suction pad 112 taking contact point as fulcrum.

The contact point is set for an extended hand, and the position and the orientation of the contact point is set as {Pe, φe}. Because ex and ey are very small in step S18, it is assumed that φe=φ. {Pe, φe} is expressed as follows using the pad installation position offset (Po), the pad radius (Pr), θ that is obtained in step S16, and the original hand position/orientation {P, φ} shown in FIG. 10.

$$\{Pe,φe\}=FK(\{P,φ\},\{Po,Pr,θ\})$$

Here, Pe is the center of rotation, Po is the offset of the suction pad installation position (the distance between the center of the suction surface of the suction pad 112 and the position of the conveyance hand), and Pr is the radius of the suction pad 112. FK is a kinematics function for obtaining {Pe, φe} from {P, φ}. The inverse kinematics function IK corresponding to FK exists, and is set as follows.

$$\{P,φ\}=IK(\{Pe,φe\},\{Po,Pr,θ\})$$

Assuming that Pe is the rotation center, and a command that gives rotation on a plane that passes through Pe and the central axis of the suction pad 112 is {Pev, φev}, the operation control unit 13 determines {Pv, φω} using the above IK or Jacobian derived from the IK. This set is defined as a command speed and a command angular velocity.

As described above, the operation control unit 13 changes the inclination of the suction pad 112 in accordance with the obtained command speed. Thereafter, the process proceeds to step S20.

Step S20

In step S20, the operation control unit 13 determines whether or not the suction pad 112 and the workpiece W are entirely in contact with each other. More specifically, the operation control unit 13 performs the determination through the same process as that in step S14 described above. If the operation control unit 13 determines that the suction surface of the suction pad 112 and the workpiece W are entirely in contact with each other (YES in step S20), the operation control unit 13 completes the control of the inclination of the suction pad 112 and shifts to the control of the amount of pressing. If the operation control unit 13 does not determine that the suction surface of the suction pad 112 and the workpiece W are entirely in contact with each other (NO in step S20), the process returns to step S18, and the operation control unit 13 continues to control the inclination of the suction pad 112.

According to the above operation example, after the suction pad 112 has come into contact with the workpiece W, the operation control unit 13 specifies the position of the contact point and the inclination of the suction pad 112, and changes the inclination of the suction pad 112 to bring the suction pad 112 into intimate contact with the surface to be suctioned of the workpiece W while maintaining the contact at the contact point. Therefore, the orientation of the suction pad 112 can be accurately corrected, and the workpiece W can be reliably picked up.

Operation Example 2

Figure 12:
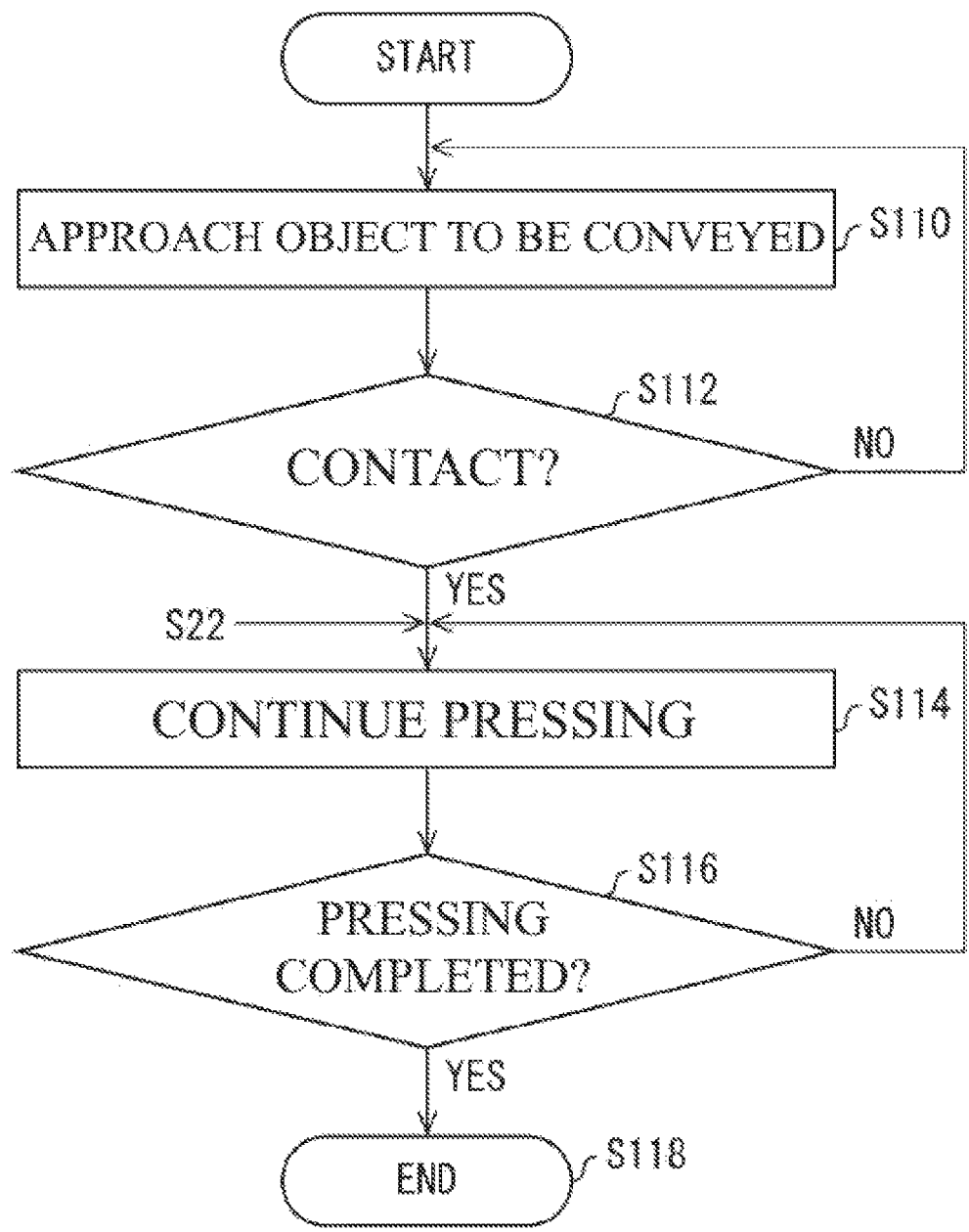
FIG. 12 is a flowchart illustrating an operation of a suction apparatus in another embodiment or embodiments.
Figure 13:
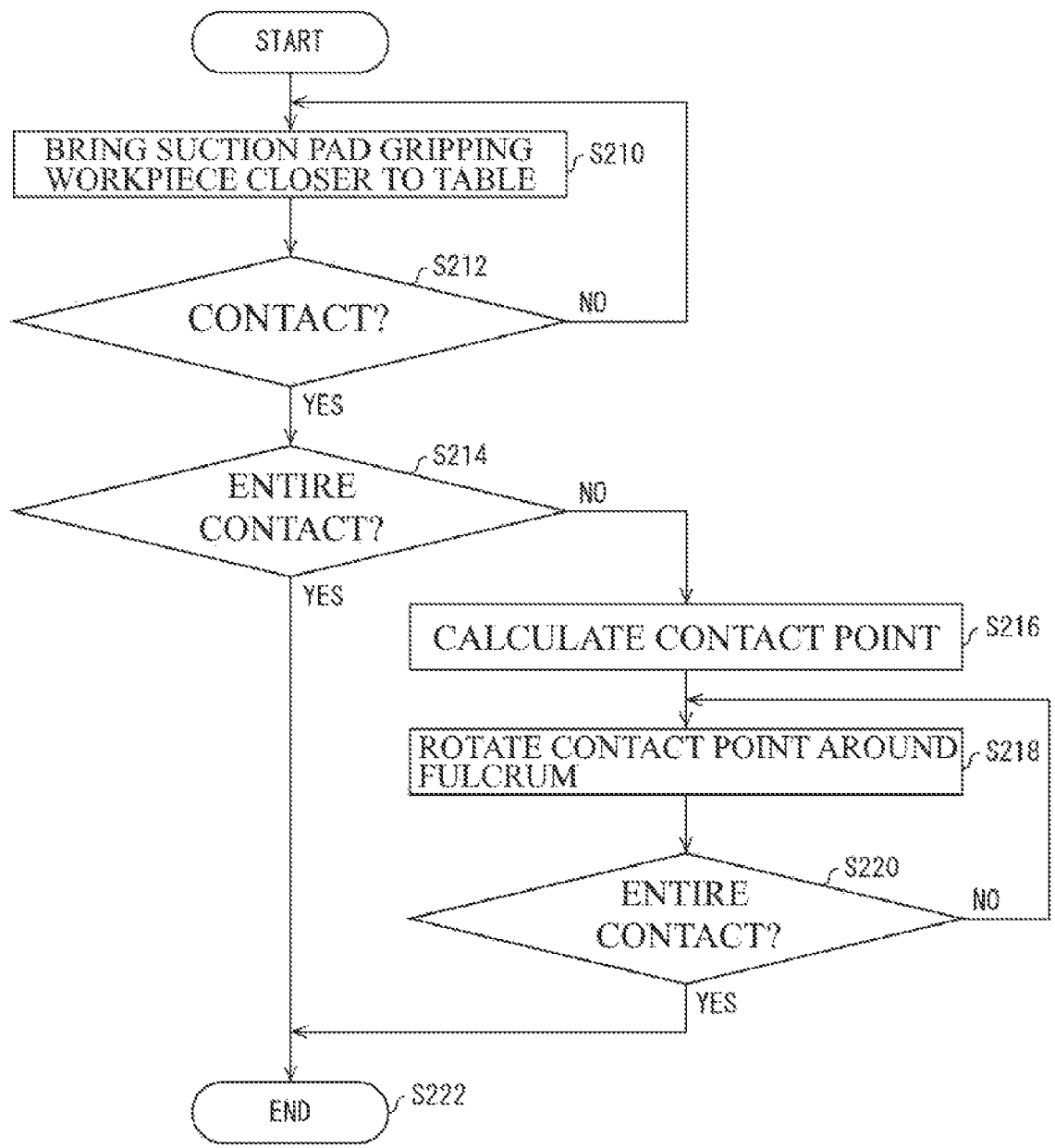
FIG. 13 is a flowchart illustrating an operation of a suction apparatus in still another embodiment or embodiments.

FIG. 12 is a flowchart showing the operation of a controller 5 in another embodiment of the present invention. Next, with reference to FIG. 12, an operation example in a case where the suction pad 112 presses the workpiece W before suctioning or placing an object will be described.

Step S110

First, in step S110, the operation control unit 13 causes the suction pad 112 to approach the workpiece W by lowering the suction pad 112 in the vertical direction.

Step S112

Next, in step S112, the operation control unit 13 determines whether or not the suction pad 112 has come into contact with the workpiece W, based on the amount of deformation of the suction pad 112.

If the operation control unit 13 determines that the suction pad 112 has come into contact with the workpiece W based on the amount of deformation of the suction pad 112 (YES in step S112), the process proceeds to step S114. If the operation control unit 13 does not determine that a part of the suction pad 112 has come into contact with the workpiece W (NO in step S112), the process returns to step S110 and the operation control unit 13 continues the approach of the suction pad 112 to the workpiece W.

Step S114

Next, in step S114, the operation control unit 13 continues to press the suction pad 112 onto the workpiece W. At this time, the operation control unit 13 may also change the speed of the suction pad 112 in accordance with the deformation of the suction pad 112. If the amount of deformation (amount of pressing ez) of the suction pad 112 exceeds a first threshold value, the operation control unit 13 may also reduce the speed at which the suction pad 112 is brought closer to the workpiece W. That is to say, the operation control unit 13 may also reduce the speed of the suction pad 112 in step S114 with respect to the speed of the suction pad 112 in step S110. Thereafter, the process proceeds to step S116.

Step S116

In step S116, the operation control unit 13 determines whether or not the pressing of the suction pad 112 onto the workpiece W is completed. In this step, letting the threshold value of the amount of pressing ez of the suction pad 112 against the workpiece W be c2, the operation control unit 13 determines that the amount of pressing is sufficient if the following expression is satisfied, and otherwise does not determine that the amount of pressing is sufficient.

$ez > \varepsilon 2$

Then, if the operation control unit 13 determines that the pressing of the suction pad 112 onto the workpiece W is completed (YES in step S116), the operation control unit 13 stops the movement of the suction pad 112. At this time, for example, if the amount of deformation of the suction pad 112 exceeds a second threshold value that is larger than the first threshold value, the operation control unit 13 may also stop the operation of bringing the suction pad 112 closer to the workpiece W.

When the pressing control is ended, the operation control unit 13 turns ON the vacuum pump 12 and starts suction of the object. If the deformation information obtaining unit 113 does not determine that the pressing of the suction pad 112 onto the workpiece W is completed (NO in step S116), the process returns to step S114 to continue the pressing.

In the above operation example, the deformation information obtaining unit 113 observes the amount of pressing of the suction pad 112 onto the workpiece W based on the amount of deformation of the suction pad 112, and determines whether or not to continue the pressing. Therefore, because the amount of pressing ez onto the workpiece W can be kept within a certain range, the suction pad 112 can be pressed onto the workpiece W as appropriate when the workpiece W is picked up or placed.

Operation Example 3

Next, with reference to FIG. 13, an operation example when the suction pad 112 that is gripping the workpiece W places the workpiece W on the table will be described.

Step S210

First, in step S210, the operation control unit 13 causes the suction pad 112 (the workpiece W) to approach the table by lowering the suction pad 112 in the vertical direction.

Step S212

Next, in step S212, the operation control unit 13 determines whether or not a part of the workpiece W that is gripped by the suction pad 112 has come into contact with the table at the contact point. Here, the operation control unit 13 basically performs the same process as the process in step S12 in the operation example 1 described above. Due to the suction and the weight of the workpiece W, the amount of deformation {ex0, ey0, ez0} of the suction pad 112 before the workpiece W has come into contact with the table is not zero. The operation control unit 13 records the amount of deformation {ex0, ey0, ez0} of the suction pad 112 before the workpiece W has come into contact with the table. Then, if the following expression is satisfied, the operation control unit 13 determines that the workpiece W that is being gripped by the suction pad 112 is in contact with the table, and otherwise determines that the workpiece W is not in contact with the table.

$|(ex-ex0, ey-ey0)| > \varepsilon 4$, or $|ez-ez0| > \varepsilon 5$

If the operation control unit 13 determines that a part of the workpiece W (the surface that is not suctioned) is in contact with the table (YES in step S212), the process proceeds to step S214. If the operation control unit 13 does not determine that a part of workpiece W is in contact with the table (NO in step S212) at the contact point, the process returns to step S210, and the operation control unit 13 continues to bring the workpiece W closer to the table.

Step S214

Next, in step S214, the operation control unit 13 determines whether or not the lower surface of the workpiece W and the table are entirely in contact with each other. When the entire lower surface of the workpiece W has come into contact with the table, the inclination of the suction pad 112 and the workpiece W is eliminated, and thus the following expression is satisfied.

$$|(ex-ex0, ey-ey0)| < \varepsilon 4$$

Therefore, the operation control unit 13 determines that the entire lower surface of the workpiece W is in contact with the table if the above expression is satisfied, and otherwise determines that the lower surface of the workpiece W is not in contact with the table.

If the operation control unit 13 determines that the lower surface of the workpiece W and table are entirely in contact with each other (YES in step S214), the operation control unit 13 completes the inclination control of the suction pad 112, and shifts to the control of the amount of pressing described above. If the operation control unit 13 does not determine that the workpiece W and the table are entirely in contact with each other (NO in step S14), the process proceeds to step S216.

Step S216

In step S216, the contact point specifying unit 131 specifies the position of the contact point where the workpiece W contacts the surface of the table on which the workpiece W is to be placed, based on the deformation of the suction pad 112. Here, the deformation information obtaining unit 113 performs basically the same process as that in step S16 in the operation example 1. However, the deformation information obtaining unit 113 executes the following calculation using the recorded offset {ex0, ey0, ez0}.

$$\theta = \arctan((ey-ey0)/(ex-ex0))$$

When the contact point where the workpiece W contacts the surface of the table on which the workpiece W is to be placed is specified by the above process, the process proceeds to step S218.

Step S218

In step S218, the operation control unit 13 changes the inclination of the suction pad 112, while maintaining the contact between the workpiece W and the surface of the table on which the workpiece W is to be placed at the specified contact point (contact side). At this time, the operation control unit 13 changes the inclination of the suction pad 112 to reduce the angle formed by the surface of the suctioned workpiece W, which is not the suctioned surface, and the surface of the table on which the workpiece W is to be placed.

Then, the operation control unit 13 basically performs the same process as that in step S18 in the operation example 1 described above, and obtains a command speed for aligning the suction surface of the suction pad 112 with the surface of the table by changing the inclination of the workpiece W while maintaining the contact at the contact point.

However, the operation control unit 13 uses the recorded offset {ex0, ey0, ez0} to perform a calculation by reading the symbols as follows.

ez is read as ez-ez0.

{Pe, φd}: the contact point between the suction pad 112 and the workpiece W is read as the contact point between the workpiece W and the table. {FK({P, φ}, {Po, Pr, θ}) is read as {FK({P, φ}, {Po+Wh/2, Pr+Wl/2, θ})

Here, Wh is the height of the workpiece W, Wl is the width of the workpiece W, and FK is the same kinematics function as FK in step S18 in the operation example 1.

As a result, the expression in step S18 in the operation example 1 is read as follows.

{P,φ}=IK({Pe,φe},{Po,Pr,θ}) is read as {P,φ}=IK({Pe,φe},{Po+Wh/2,Pr+Wl/2,θ})

Ik in the above expression is the same kinematics function as IK in step S18 in the operation example 1.

In response to the above process, the operation control unit 13 changes the inclination of the suction pad 112 in accordance with the obtained command speed. Thereafter, the process proceeds to step S220.

Step S220

Next, in step S220, the operation control unit 13 determines whether or not the surface of the workpiece W, which is not the suctioned surface, and the surface of the table on which the workpiece W is to be placed are entirely in contact with each other. At this time, the operation control unit 13 performs the same process as that in the step S214 described above.

If the operation control unit 13 determines that the surface of the workpiece W, which is not the suctioned surface, and the surface of the table on which the workpiece W is to be placed are entirely in contact with each other (YES in step S220), the operation control unit 13 completes the inclination control of the suction pad 112, stops the suction, and releases the workpiece. If the operation control unit 13 does not determine that the surface of the workpiece W, which is not the suctioned surface, and the surface of the table on which the workpiece W is to be placed are entirely in contact with each other (NO in step S220), the process returns to step S218, and the operation control unit 13 continues the inclination control of the suction pad 112.

In the above operation example, the operation control unit 13 specifies the position of the contact point and the inclination of the suction pad 112 after the surface of the workpiece W, which is not the suctioned surface, and the surface of the table on which the workpiece W is to be placed have come into contact with each other, and changes the inclination of the suction pad 112 so that the surface of the workpiece W, which is not the suctioned surface, and the surface of the table on which the workpiece W is to be placed are entirely in contact with each other while maintaining the contact at the contact point. In this manner, the orientation of the suction pad 112 can be accurately corrected, and the workpiece W can be placed at an accurate position. Furthermore, it is possible to prevent an impact from being applied to the workpiece W released from the suction pad 112, or prevent that workpiece W from falling over.

Modified Example 1

Figure 14:
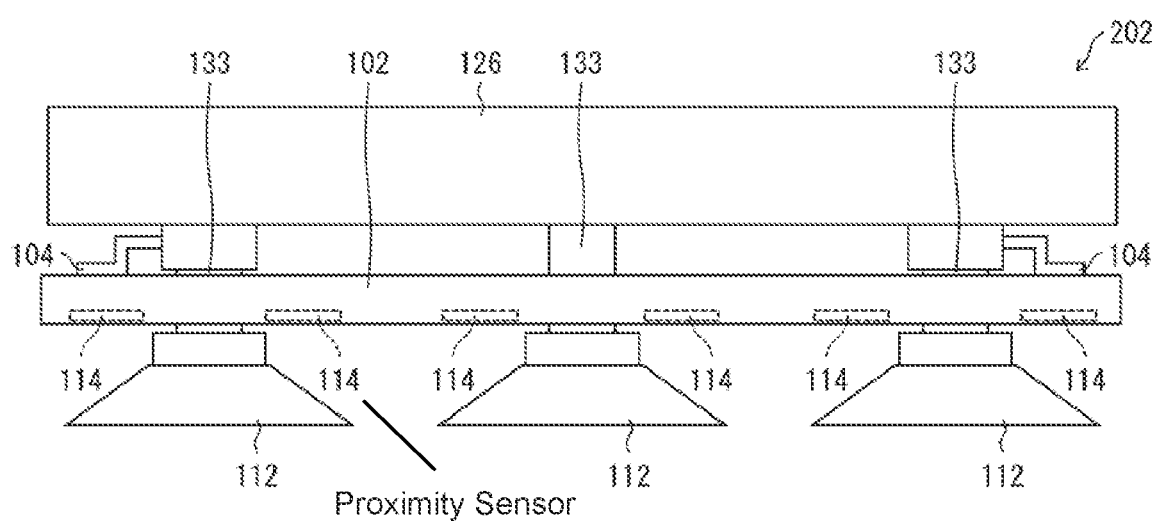
FIG. 14 is a block diagram illustrating an example of a configuration of a suction apparatus according to one or more embodiments in a modified example 1.

FIG. 14 illustrates an example of a suction apparatus in a modified example 1. In the example of FIG. 14, a suction apparatus 202 includes a support 126, three shafts 133, three suction portions 112, a main body 102, and two fixtures 104. The three suction portions 112 are provided on the support 126 via the three shafts 133, respectively. The support 126 is attachable to, for example, a robot arm of the suction apparatus. The main body 102 is fixed to the two shafts 133 with the two fixtures 104. The main body 102 includes a plurality of the first proximity sensors 114 at positions corresponding to the three suction portions 112. Due to the suction apparatus 202 including the plurality of suction portions 112, the suction apparatus 202 can reliably grip an object with sufficient suction force, even when the object is large. In addition, the suction apparatus 202 can individually detect deformation of the plurality of suction portions 112.

Modified Example 2

Figure 15:
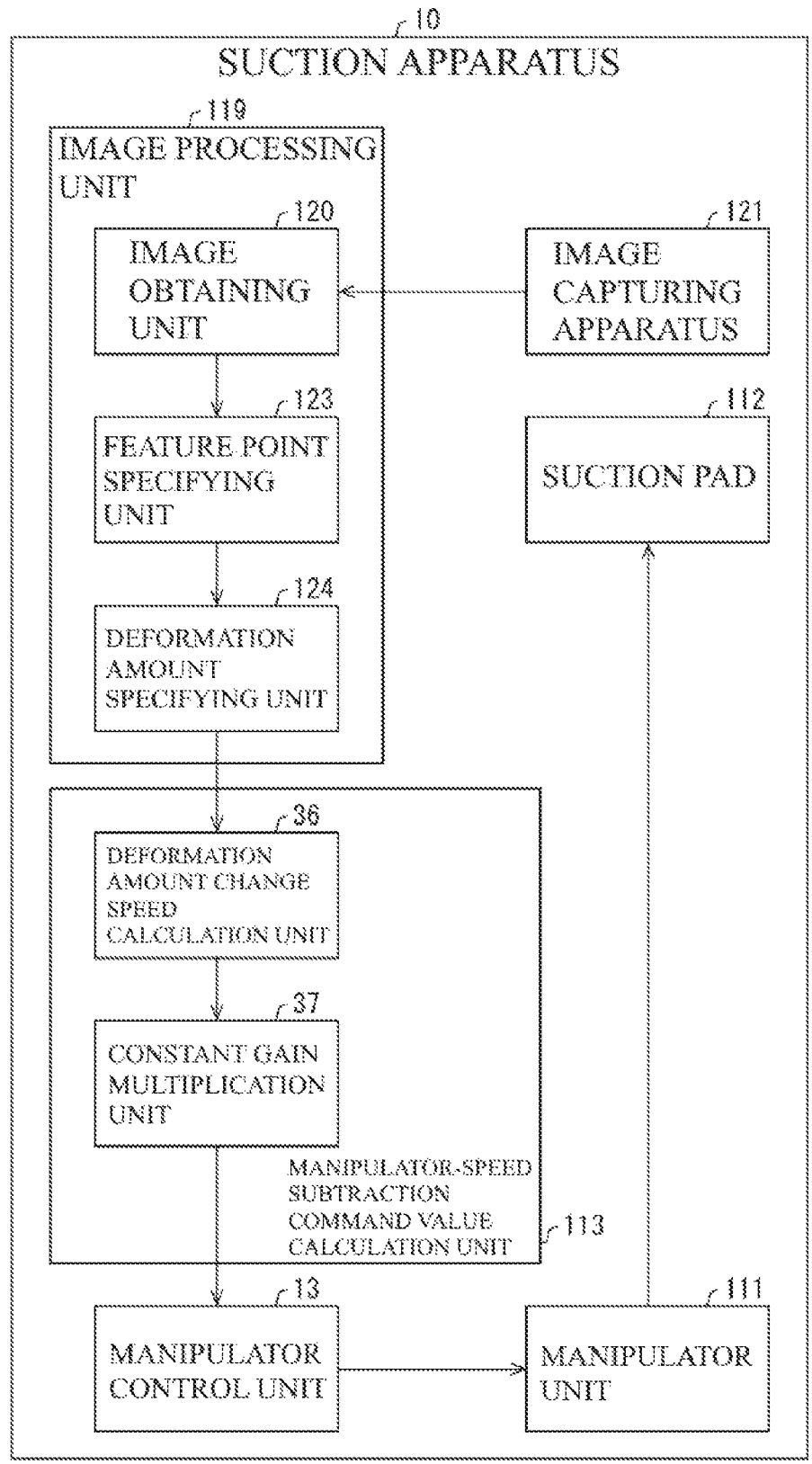
FIG. 15 is a block diagram illustrating an example of a schematic configuration of a suction apparatus according to one or more embodiments in a modified example 2.

FIG. 15 is a block diagram illustrating an example of a schematic configuration of a suction apparatus according to the present embodiment in a modified example 2. In the example of FIG. 15, a suction apparatus 10 includes a suction pad 112, an image capturing apparatus 121, a manipulator unit 111, an image processing unit 119, a manipulator control unit 13, and a manipulator-speed subtraction command value calculation unit 113. The image processing unit 119 includes an image obtaining unit 120, a feature point specifying unit 123, and a deformation amount specifying unit 124. The manipulator-speed subtraction command value calculation unit 113 includes a deformation amount change speed calculation unit 36 and a constant gain multiplication unit 37. The deformation amount change speed calculation unit 36 may also be included in the image processing unit 119, not in the manipulator speed subtraction command value calculation unit 113.

The image capturing apparatus 121 captures an image of the suction pad 112. The image data may be monochrome image data, or may also be color image data.

The image obtaining unit 120 obtains image data captured by the image capturing apparatus 121. Then, the image obtaining unit 120 inputs the obtained imaged data to the feature point specifying unit 123.

The feature point specifying unit 123 specifies the feature point included in the image data that is received from the image obtaining unit 120. Then, the feature point specifying unit 123 outputs, to the deformation amount specifying unit 124, the coordinate values of the feature points in the image coordinate system. The feature point specifying unit 123 also specifies the coordinates (a plurality of coordinates) of the fixed portions 117, which are not deformed, of the suction pad 112, as the reference coordinates. The displacement of the respective feature points can be obtained, based on the coordinates of the feature points relative to the reference coordinates.

The deformation amount specifying unit 124 specifies the amounts of deformation of the plurality of portions of the suction pad 112 (that is to say, the amount of deformation of the suction pad), based on the feature points (coordinate values) and the coordinates of the fixed portions that are output from the feature point specifying unit 123.

The manipulator control unit 13 determines the operation of the manipulator unit 111, based on the amount of deformation that is specified by the deformation amount specifying unit 124. Then, the manipulator control unit 13 instructs the manipulator unit 111 to perform the determined operation.

The manipulator unit 111 is driven together with the suction pad 112 in the robot arm 11, based on the instruction from the manipulator control unit 13.

The deformation amount change speed calculation unit 36 calculates the change speed of the amount of deformation, by time-differentiating the amount of deformation that is specified by the deformation amount specifying unit 124. Then, the deformation amount change speed calculation unit 36 outputs the change speed of the amount of deformation to the constant gain multiplication unit 37.

The constant gain multiplication unit 37 calculates a deceleration value, by multiplying the change speed of the amount of deformation (the angular velocity of the suction surface of the suction pad, for example), which is calculated by the deformation amount change speed calculation unit 36, by a constant. The constant gain multiplication unit 37 outputs the calculated deceleration value to the manipulator control unit 13.

The manipulator control unit (operation control unit) 13 stores a target moving speed of the suction pad 112 for conveying the object. The manipulator control unit 13 obtains the command speed, by subtracting the deceleration value from the target moving speed. The manipulator control unit 13 controls the manipulator unit 111 to move the hand (suction pad 112) of the manipulator at the command speed. By changing the speed of the hand of the robot arm to reduce the change speed of the amount of deformation of the suction pad 112, vibration of the suction pad 112 (vibration of the object) can be reduced.

Similarly, the manipulator control unit 13 may also change the inclination of the suction pad 112 to decrease the change speed of the amount of deformation, based on the change speed of the amount of deformation. By changing the inclination of the suction pad 112, the vibration of the suction pad 112 can be controlled. In addition, by utilizing the inclination of the suction pad 112 for vibration damping control, the positioning time at the time of stopping conveyance can be minimized, and the conveyance processing time (conveyance tact time) can be shortened.

Figure 16:
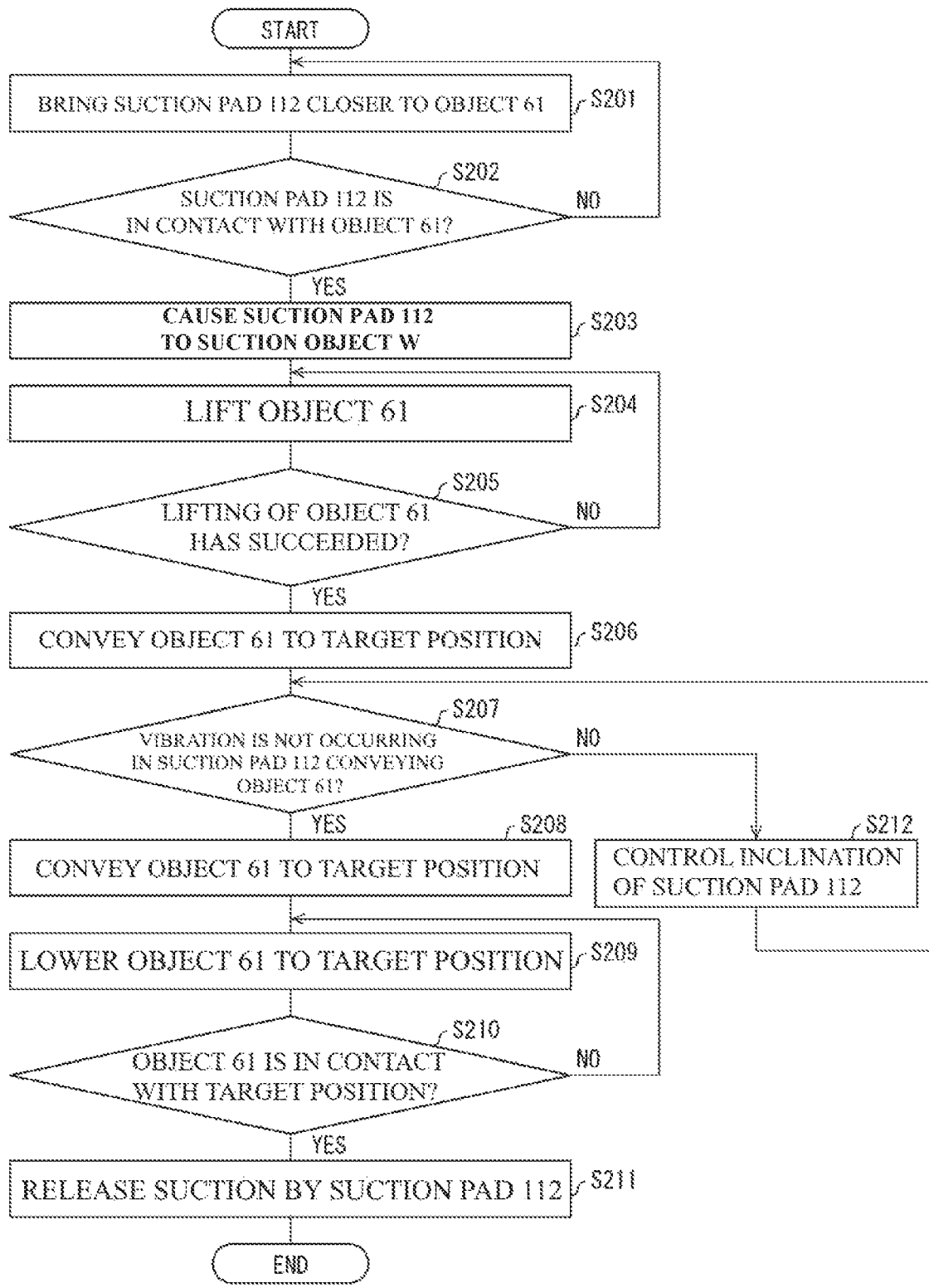
FIG. 16 is a flowchart illustrating an example of a flow of a process of a suction apparatus according to one or more embodiments in a modified example 2.
Figure 17:
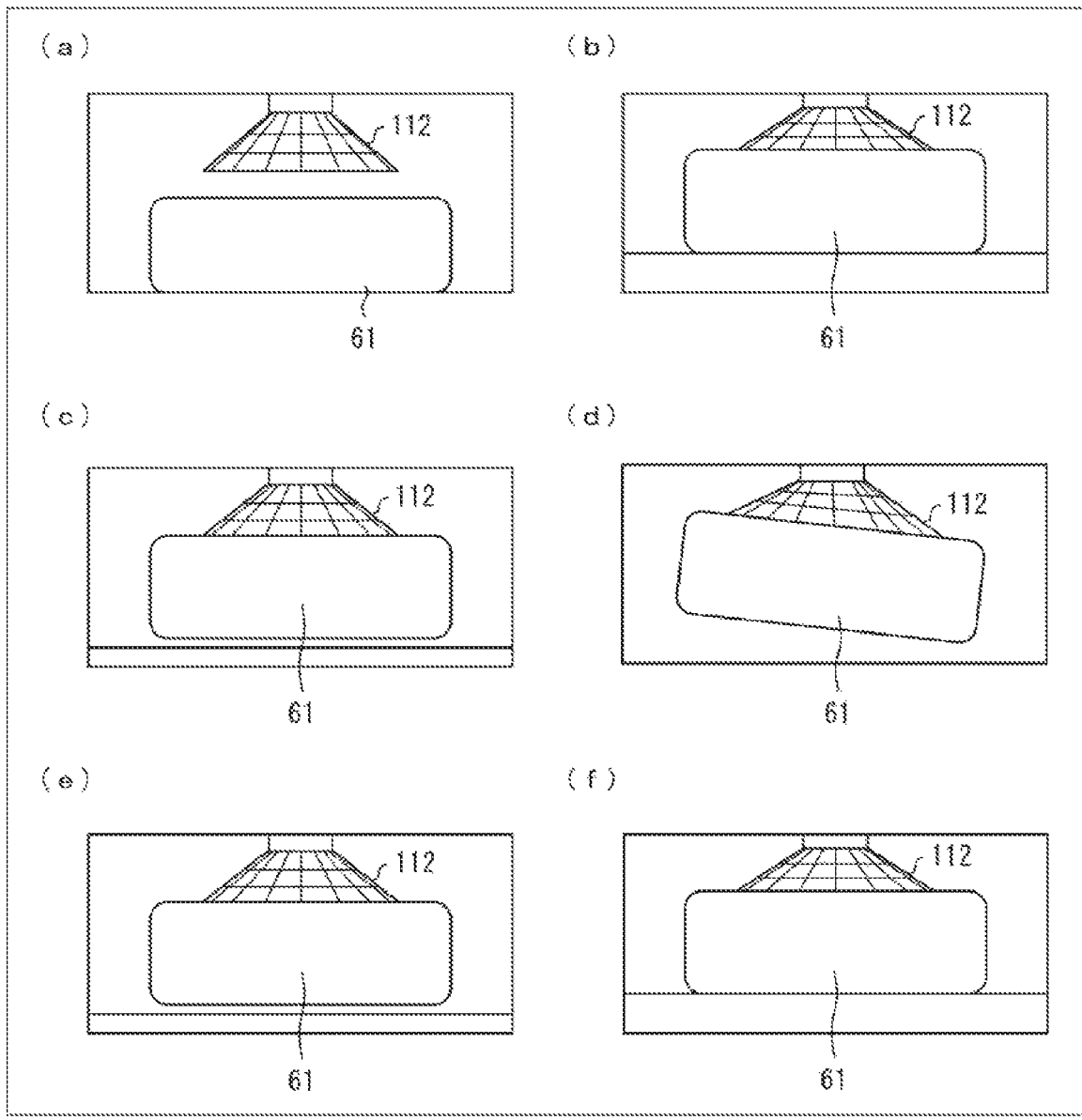
FIG. 17 is a schematic diagram illustrating an example of a flow of the process of a suction apparatus according to one or more embodiments in a modified example 2.

FIG. 16 is a flowchart showing an example of a flow of a process performed by a suction apparatus according to the present embodiment in the modified example 2. FIG. 17 is a schematic diagram showing an example of the flow of the process performed by the suction apparatus according to the present embodiment in the modified example 2.

In step S201, the manipulator control unit 13 brings the suction pad 112 closer to the object 61. The example of FIG. 17(a) shows the process in step S201. Next, in step S202, the manipulator control unit 13 determines whether or not the suction pad 112 is in contact with the object 61. Whether or not the suction pad 112 is in contact with the object 61 can be determined by the amount of deformation of a variable portion 118 in the suction pad 112. If the amount of deformation is larger than or equal to a threshold value, the manipulator control unit 13 determines that the suction pad 112 is in contact with the object 61. If the manipulator control unit 13 determines that the suction pad 112 is in contact with the object 61 (YES in step S202), the manipulator control unit 13 causes the suction pad 112 to suction the object 61 (step S203). The example of FIG. 17(b) shows the process in step S203. If the manipulator control unit 13 determines that the suction pad 112 is not in contact with the object 61 (NO in step S202), the manipulator control unit 13 executes the processes of steps S201 and S202 again.

In step S204, the manipulator control unit 13 causes the manipulator unit 111 to lift the object 61. The example of FIG. 17(c) shows the process in step S204. Next, in step S205, the manipulator control unit 13 determines whether or not the lifting of the object 61 has succeeded. Whether or not the object 61 has been successfully lifted can be determined by the amount of deformation of the variable portion 118 of the suction pad 112. If the amount of deformation is larger than or equal to another threshold value, the manipulator control unit 13 determines that the lifting of the object 61 has succeeded. If the manipulator control unit 13 determines that the lifting of the object 61 has succeeded (YES in step S205), the manipulator control unit 13 conveys the object 61 to the target position (step S206). The example of FIG. 17(d) shows the process in step S206. If the manipulator control unit 13 determines that the lifting of the object 61 has failed (NO in step S205), the manipulator control unit 13 executes the processes of steps S204 and S205 again.

In step S207, the manipulator control unit 13 determines whether or not vibration occurs in the suction pad 112 that is conveying the object 61. If the change speed of the amount of deformation of the suction pad 112 is larger than or equal to still another threshold value, the manipulator control unit 13 determines that the vibration is occurring in the suction pad 112 that is conveying the object 61. If the manipulator control unit 13 determines that the vibration is not occurring in the suction pad 112 that is conveying the object 61 (YES in step S207), the manipulator control unit 13 conveys the object 61 to the target position without changing the inclination of the object 61 (step S208). If the manipulator control unit 13 determines that vibration is occurring in the suction pad 112 that is conveying the object 61 (No in step S207), the manipulator control unit 13 controls the inclination of the suction pad 112 (step S212). Then, the manipulator control unit 13 executes the process of step S207 again.

In step S209, the manipulator control unit 13 causes the manipulator unit 111 to lower the object 61 to the target position. The example of FIG. 17(e) shows the process in step S209. Next, in step S210, the manipulator control unit 13 determines whether or not the object 61 has come into contact with the target position. Whether or not the object 61 has come into contact with the target position can be determined by the amount of deformation of the variable portion 118 of the suction pad 112. If the amount of deformation is larger than or equal to still another threshold value, the manipulator control unit 13 determines that the object 61 has come into contact with the target position. If the manipulator control unit 13 determines that the object 61 has come into contact with the target position (YES in step S210), the manipulator control unit 13 releases the suction of the object 61 by the suction pad 112 (step S211). The example of FIG. 17(f) shows a case where the determination in step S210 is YES. If the manipulator control unit 13 determines that the object 61 has not come into contact with the target position (NO in step S210), the manipulator control unit 13 executes the processes of steps S209 and S210 again.

The present invention is not limited to the above-described embodiments and modified examples, and various modifications are possible within the scope of the claims. Embodiments obtained by appropriately combining technical means disclosed in different embodiments are also included in the technical scope of the present invention.

INDEX TO THE REFERENCE NUMERALS 1, 10, 202 Suction apparatus
2 Conveyance unit
3 Battery
5 Controller
11 Robot arm
12 Vacuum pump
13 Operation control unit
14 Object information obtaining unit
15 Placement information obtaining unit
21 Negative pressure control unit
22 Automated guided vehicle
36 Deformation amount change speed calculation unit
37 Constant gain multiplication unit
61 Object (workpiece)
100 Mobile suction apparatus
101 Sensor assembly
102 Main body
104 Fixture
105 Space
111 Manipulator unit
112 Suction portion (suction pad)
113 Manipulator-speed subtraction command value calculation unit (deformation information obtaining unit)
114 First proximity sensor
115 Abnormality determination unit
119 Image processing unit
120 Image obtaining unit
121 Image capturing apparatus
123 Feature point specifying unit
124 Deformation amount specifying unit
126 Support
131 Contact point specifying unit
133 Shaft
134 Tube
141 Fixed portion
142 Support portion
151 Sensor wiring
211 Analog signal output unit
221 Conveyance control unit

The invention claimed is:

1. A sensor assembly that is attachable to a suction apparatus including a suction portion configured to suction an object with negative pressure, and a shaft configured to support the suction portion and having an air passage, the sensor assembly comprising:
   a main body in which a space through which the shaft of the suction apparatus passes is formed;
   a plurality of first proximity sensors that are disposed on the main body, and configured to detect that the suction portion is deformed by the negative pressure, to measure an amount of displacement of the suction portion in a radial direction of the suction portion with respect to the shaft, and to measure an amount of deformation of the suction portion so as to determine whether the suction portion is in a state in which suctioning the object is possible; and
   a fixture that has a fixed portion that is fixed to the shaft, and a support portion that is configured to support the main body.

2. The sensor assembly according to claim 1,
   wherein the support portion extends from the fixed portion toward the suction portion.

3. The sensor assembly according to claim 2,
   wherein a plurality of the first proximity sensors are disposed on the main body along a circumferential direction of the shaft.

4. The sensor assembly according to claim 2,
   wherein the one or more first proximity sensors are disposed in a circular shape covering the suction portion.

5. The sensor assembly according to claim 2,
   wherein the plurality of the first proximity sensors are disposed on the main body along the radial direction with respect to the shaft.

6. The sensor assembly according to claim 2,
   wherein the main body is supported by the support portion on a suction portion side relative to the fixed portion.

7. The sensor assembly according to claim 6,
   wherein a plurality of the first proximity sensors are disposed on the main body along a circumferential direction of the shaft.

8. The sensor assembly according to claim 6,
   wherein the one or more first proximity sensors are disposed in a circular shape covering the suction portion.

9. The sensor assembly according to claim 6,
   wherein the plurality of the first proximity sensors are disposed on the main body along the radial direction with respect to the shaft.

10. The sensor assembly according to claim 1,
wherein a plurality of the first proximity sensors are disposed on the main body along a circumferential direction of the shaft.

11. The sensor assembly according to claim 10,
wherein the one or more first proximity sensors are disposed in a circular shape covering the suction portion.

12. The sensor assembly according to claim 10,
wherein the plurality of the first proximity sensors are disposed on the main body along the radial direction with respect to the shaft.

13. The sensor assembly according to claim 1,
wherein the one or more first proximity sensors are disposed in a circular shape covering the suction portion.

14. The sensor assembly according to claim 1,
wherein the plurality of the first proximity sensors are disposed on the main body along the radial direction with respect to the shaft.

15. The sensor assembly according to claim 1, further comprising:
one or more third proximity sensors that are disposed on a radially outer side of the first proximity sensor with respect to the shaft in the main body, and that are configured to detect the object.

16. The sensor assembly according to claim 1, further comprising:
one or more second proximity sensors that are disposed on a side surface of the main body, and that are configured to detect an object approaching the side surface of the main body.

17. The sensor assembly according to claim 16,
wherein a plurality of the second proximity sensors are disposed on the side surface of the main body along the circumferential direction of the shaft.

18. A suction apparatus comprising:
the sensor assembly according claim 1;
a suction portion configured to suction an object with negative pressure; and
a shaft configured to support the suction portion, and having an air passage.

19. The suction apparatus according to claim 18,
wherein the suction portion comprises a conductive member at a portion to be displaced, and
the one or more first proximity sensors are capacitive sensors or electromagnetic induction sensors.

20. The suction apparatus according to claim 19,
wherein the suction portion is grounded.

* * * * *